(12) United States Patent
Seuthe et al.

(10) Patent No.: US 12,246,980 B2
(45) Date of Patent: Mar. 11, 2025

(54) GLASS SUBSTRATE FOR VEHICLE GLAZING, IN PARTICULAR FOR THE WINDSCREEN OF A VEHICLE

(71) Applicant: SCHOTT AG, Mainz (DE)

(72) Inventors: Thomas Seuthe, Jena (DE); Thilo Zachau, Neuengönna (DE); Thomas Schmiady, Jena (DE); Sandra von Fintel, Jena (DE); Jochen Alkemper, Klein Winternheim (DE)

(73) Assignee: SCHOTT AG, Mainz (DE)

( * ) Notice: Subject to any disclaimer, the term of this patent is extended or adjusted under 35 U.S.C. 154(b) by 443 days.

(21) Appl. No.: 16/808,520

(22) Filed: Mar. 4, 2020

(65) Prior Publication Data
US 2020/0354253 A1 Nov. 12, 2020

(30) Foreign Application Priority Data
Mar. 4, 2019 (DE) ................. 10 2019 105 421.4

(51) Int. Cl.
*C03B 18/06* (2006.01)
*C03B 18/20* (2006.01)
(Continued)

(52) U.S. Cl.
CPC ............. *C03B 18/06* (2013.01); *C03B 18/20* (2013.01); *C03C 3/089* (2013.01); *C03C 3/091* (2013.01)

(58) Field of Classification Search
CPC .......... C03B 18/02; C03B 18/06; C03B 18/04
See application file for complete search history.

(56) References Cited

U.S. PATENT DOCUMENTS 3,468,650 A * 9/1969 Boaz ................. C03B 18/08
65/200
3,499,776 A * 3/1970 Baak ................. C03C 3/093
501/67
(Continued)

FOREIGN PATENT DOCUMENTS

CN 105307898 2/2016
DE 10209742 A1 * 9/2003 ............. C03B 18/18
(Continued)

OTHER PUBLICATIONS

ASTM D 1003—07, "Standard Test Method for Haze and Luminous Transmittance of Transparent Plastics", 7 pages.
(Continued)

*Primary Examiner* — Erin Snelting
*Assistant Examiner* — Steven S Lee
(74) *Attorney, Agent, or Firm* — Ruggiero McAllister & McMahon LLC

(57) ABSTRACT

The invention relates to a method for producing a glass substrate for vehicle glazing, in particular for a windscreen of a vehicle, which comprises hot forming of a borosilicate glass, wherein in a hot forming section, at least during stretching of the glass (8) in the flow direction or longitudinal direction of movement of the glass (8), an aging velocity Av of the glass (8) to be hot formed does not exceed 10 mm/s and an aging velocity Av of the glass preferably does not undershoot 3 mm/s, and also relates to glass substrates for vehicle glazing produced by such method as well as to windscreen projection devices and driver assistance systems comprising such glass substrates.

26 Claims, 12 Drawing Sheets

(51) Int. Cl.
*C03C 3/089* (2006.01)
*C03C 3/091* (2006.01)

(56) References Cited

U.S. PATENT DOCUMENTS

| | | | | |
|---|---|---|---|---|
| 3,520,672 | A * | 7/1970 | Greenler | C03B 18/06 65/200 |
| 3,531,274 | A * | 9/1970 | Dickinson | C03B 18/22 65/99.5 |
| 3,533,772 | A * | 10/1970 | Itakura | C03B 18/06 65/200 |
| 3,661,548 | A * | 5/1972 | Ito | C03B 18/06 65/182.4 |
| 3,695,859 | A | 10/1972 | Dickerson | |
| 3,709,673 | A * | 1/1973 | Bishop | C03B 18/06 65/182.4 |
| 3,843,344 | A * | 10/1974 | Galey | C03B 5/267 65/182.4 |
| 3,843,346 | A * | 10/1974 | Edge | C03B 5/183 65/182.4 |
| 3,930,828 | A * | 1/1976 | Kunkle | C03B 18/04 65/182.3 |
| 4,038,352 | A * | 7/1977 | Hennequin | C03B 18/02 264/DIG. 25 |
| 4,299,612 | A * | 11/1981 | Sensi | C03B 18/06 65/182.3 |
| 4,316,735 | A * | 2/1982 | Schultz | C03B 18/04 65/182.4 |
| 4,325,724 | A * | 4/1982 | Froberg | C03B 5/173 65/121 |
| 4,328,021 | A * | 5/1982 | Wehner | C03B 18/04 65/173 |
| 4,343,642 | A * | 8/1982 | Edge | C03B 18/06 65/182.4 |
| 4,375,370 | A * | 3/1983 | Mouly | C03B 18/06 65/182.3 |
| 4,460,397 | A * | 7/1984 | Kapura | C03B 18/06 65/182.4 |
| 4,676,818 | A * | 6/1987 | Yigdall | C03B 18/06 65/182.4 |
| 5,628,808 | A * | 5/1997 | Jantzen | C03B 5/235 65/168 |
| 5,812,332 | A * | 9/1998 | Freeman | B32B 17/10761 428/56 |
| 6,094,942 | A * | 8/2000 | Falleroni | C03B 18/18 65/182.3 |
| 7,059,154 | B1 * | 6/2006 | Quentin | C03B 18/06 65/133 |
| 10,442,723 | B2 * | 10/2019 | Lautenschlaeger | C03C 3/091 |
| 10,669,184 | B2 * | 6/2020 | Katayama | B23K 26/359 |
| 2003/0215610 | A1 * | 11/2003 | DiGiampaolo | B32B 17/10155 428/156 |
| 2004/0261458 | A1 * | 12/2004 | Uhlik | C03B 18/16 65/182.3 |
| 2005/0000248 | A1 | 1/2005 | Lauten-Schlaeger | |
| 2006/0110603 | A1 * | 5/2006 | Langsdorf | C03B 18/06 65/99.2 |
| 2006/0260362 | A1 * | 11/2006 | Uhlik | C03B 18/20 65/182.3 |
| 2016/0101714 | A1 | 4/2016 | Szlag | |
| 2016/0176751 | A1 * | 6/2016 | Lautenschlaeger | C03B 18/02 428/34.4 |
| 2019/0308900 | A1 | 10/2019 | Vogl | |

FOREIGN PATENT DOCUMENTS

| | | | |
|---|---|---|---|
| DE | 10350641 A1 * | 6/2005 | C03B 18/02 |
| DE | 102007028977 A1 * | 12/2008 | C03B 18/22 |
| DE | 102013203624 | 9/2014 | |
| JP | 2012001398 A * | 1/2012 | C03B 18/06 |
| JP | 2016135715 A * | 7/2016 | C03B 18/06 |
| WO | 03045862 | 6/2003 | |
| WO | 2011103801 | 9/2011 | |
| WO | WO-2013157477 A1 * | 10/2013 | C03B 18/06 |
| WO | WO-2014203569 A1 * | 12/2014 | C03B 18/06 |
| WO | WO-2016109693 A1 * | 7/2016 | A61J 1/00 |
| WO | 2018015312 | 1/2018 | |
| WO | 2018114956 | 6/2018 | |

OTHER PUBLICATIONS

ASTM D1044—19, "Standard Test Method for Resistance of Transparent Plastics to Surface Abrasion by the Taber Abraser", 8 pages.
ASTM C 1036—06, "Standard Specification for Flat Glass", 8 pages.

* cited by examiner

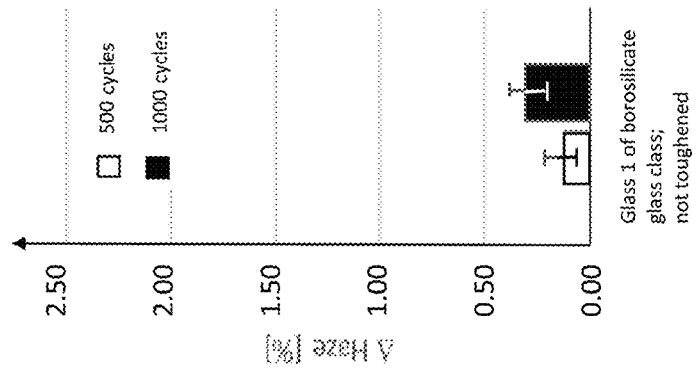
Fig. 7
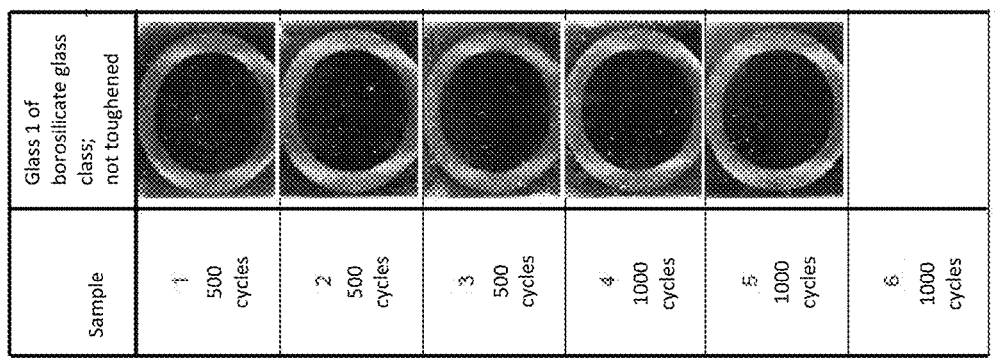
Fig. 6
Fig. 5

GLASS SUBSTRATE FOR VEHICLE GLAZING, IN PARTICULAR FOR THE WINDSCREEN OF A VEHICLE

CROSS REFERENCE TO RELATED APPLICATIONS

This application claims benefit under 35 USC § 119 of German Application 10 2019 105 421.4 filed Mar. 4, 2019 the entire contents of which are incorporated herein by reference.

SPECIFICATION

The invention relates to a glass substrate for vehicle glazing, in particular for a windscreen of a motor vehicle.

Various types of vehicle glazing, in particular motor vehicle glazing are known from the prior art.

Conventionally, soda-lime glasses are used for the majority of motor vehicle glazing, however, occasionally, other glasses are also disclosed for the manufacture of such glazing in the prior art.

International application WO 2011/103801 A1 proposes a lithium aluminosilicate glass or lithium aluminosilicate glass ceramic pane for high-speed trains, which pane is used as a single pane or in combination with other panes. A borosilicate glass pane is also disclosed, as a further pane of this composite, inter alia.

WO 2018/015312 A1 describes the use of glass for glazing of autonomously driving vehicles and for use together with infrared-based sensing devices such as LiDAR sensors. The glass used has an absorption coefficient α of less than 5/m in a wavelength range from 750 nm to 1050 nm, and various glasses based thereon are disclosed, which, besides soda-lime glass and aluminosilicate glass, may also include borosilicate glass.

WO 2018/114956 A1 discloses a glass substrate, a method and an apparatus for its production, and methods are specified for determining the optical quality in particular of glass substrates produced according to such method. This glass substrate may comprise an Li—Al—Si glass, an Al—Si glass, a borosilicate glass, or a K—Na—Si glass and exhibits reduced drawing streaks. Also, its use as part of motor vehicle glazing and in particular also as part of a laminated glass pane is disclosed.

WO 03/045862 A2 describes the production of a borosilicate glass, in particular a borosilicate glass substrate with a surface suitable for modification, and the glass obtained according to this method and its use. The goal of the invention disclosed in this document is to provide a glass with a surface that is suitable for modification and can therefore be used as a substrate basis and/or carrier for a large number of applications in which the glass surface has to be treated and/or coated with an agent. In particular after cleaning, the obtained glasses are usually coated with a desired substance by causing reactive or functional groups of the substance to covalently bind to the surface by chemical reaction with the SiOH groups of the glass. Furthermore, the use of the glass produced according to the invention as a substrate for chemically covalent immobilization of reactive substances is described, for example for a dirt-proof utility glass or window glass.

In particular vehicle glazing made of soda-lime glass has been used for a long time and is subject to various influences during its service life, which may have a detrimental effect on the utility value thereof. An example of this are abrasive effects of particulate impacts, which in the case of larger particles may, for example, result in stone chip traces and even noticeable large area abrasion traces. However, even smaller traces of smaller particles, which cause damage that is initially difficult to perceive with the naked eye may cause stray light in the case of strong backlighting or under certain incidence angles of sunshine, which might strongly reduce the perceptible contrast in imaging sensory systems.

However, with increasing use of driver assistance systems, the requirements for the optical quality of vehicle glazing, in particular windscreen glazing, also increase, since such systems often use optical sensors which may be in the form of rain sensors with reflecting beam paths, for example, or in the form of imaging sensors to provide increased safety and vehicle guidance for the driver in the traffic.

Some of these imaging sensors are suitable for recognizing traffic signs, persons, or preceding vehicles and, in driver assistance systems with their electronic and electromechanical units, are often also used to actively intervene in the control of the motor vehicle. For this purpose, however, the quality of the signal received from the respective sensor is of crucial importance for the correct functioning of these assistance systems.

However, if the respective windscreen is subject to external influences that degrade the quality of the optical signals, this might entail malfunctions and even failure of the functional units downstream in the signal chain.

These deteriorations in the signals from imaging optical sensors may become particularly awkward if, for example, light sources of small size but extremely high brightness compared to the broader environment cause stray light and thereby overexposure of further image components captured by the respective sensor. Typical situations for this are when driving in the dark with oncoming traffic, or in very bright sunlight, for example when the sun is low. In such cases, driver assistance systems have malfunctioned or even failed, which might lead to serious and even lethal personal injury.

The invention is based on the object to provide vehicle glazing, in particular motor vehicle glazing or windscreen glazing for a motor vehicle, which provides increased safety in vehicles, in particular for driver assistance systems, due to reduced optically interfering influences.

Here, optically interfering or disturbing influences are understood to mean particles or areas of the glass substrate which scatter part of the light passing through the glass substrate, i.e. deflect part of the light passing through the glass substrate from its geometric-optical propagation path and therefore have a contrast reducing effect in particular for imaging sensor systems.

It would be advantageous if the glass substrate also exhibits improved mechanical properties, such as increased abrasion resistance.

It would also be advantageous here if the glass substrate develops only comparatively reduced optically interfering effects when damaged.

Damage may be caused by mechanical impacts, or by chemical impacts, for example by salts, in particular de-icing salt, or by aggressive cleaning agents, also in combination with mechanical damage.

The object is achieved with the features of the independent claims.

Preferred embodiments will be apparent from the dependent claims and from the further disclosure in the description and the figures.

According to the invention, the method for producing a glass substrate for vehicle glazing, in particular for a windscreen of a vehicle, which comprises hot forming of a borosilicate glass in such a manner that in a hot forming section, at least during stretching of the glass in the flow direction or longitudinal direction of movement of the glass, an aging velocity Av of the glass to be hot formed does not exceed 10 mm/s and an aging velocity Av of the glass preferably does not undershoot 3 mm/s, wherein the following applies to the aging velocity:

$$Av=|Ve-Va|*Bg/Hsl$$

where

Ve is the entry velocity of the glass into the hot forming section Hs, preferably measured in m/h;

Va is the exit velocity of the hot-formed glass from the hot forming section Hs, preferably measured in m/h;

Bg is the width of the glass to be hot formed in the hot forming section Hs, preferably measured in m;

Hsl is the length of hot forming section Hs along which the glass is stretched, preferably measured in m; and Av is the aging velocity, preferably measured in mm/s.

Furthermore, according to the invention, a method for producing a glass substrate for vehicle glazing, in particular for a windscreen of a vehicle is provided, which comprises hot forming of a borosilicate glass in such a manner that in a hot forming section, at least during stretching of the glass in the flow direction or longitudinal direction of movement of the glass, a ratio of the surface area of a main surface, which is newly formed during the hot forming process, i.e. the new surface area Nf, of the glass to be hot formed, to the length of the hot forming section in the flow direction or longitudinal direction of movement of the glass and to the time t passed in the hot forming section Hs during the time of hot forming does not exceed 10 mm/s and preferably does not undershoot a value of 3 mm/s, wherein the following applies to this ratio:

$$Nf/(t*Hsl)=|Ve-Va|*Bg/Hsl$$

where

Ve is the entry velocity of the glass into the hot forming section Hs, preferably measured in m/h;

Va is the exit velocity of the hot-formed glass from the hot forming section Hs, preferably measured in m/h;

Bg is the width of the glass to be hot formed in the hot forming section Hs, preferably measured in m;

Hsl is the length of the hot forming section Hs along which the glass is stretched, preferably measured in m;

Nf is the surface area of a main surface of the glass to be hot formed, which is newly formed during the hot forming in the hot forming section, preferably measured in $m^2$; and t is the time the glass to be hot formed passes in the hot forming section Hs, preferably measured in s.

In a particularly preferred method for producing a glass substrate for vehicle glazing, an aging velocity Av of the glass to be hot formed does not exceed 8 mm/s and an aging velocity Av of the glass preferably does not undershoot 5 mm/s; and a ratio of the surface area of a main surface, which is newly formed during the hot forming process, the new surface area Nf of the glass to be hot formed, to the length of the hot forming section in the flow direction or longitudinal direction of movement of the glass and to the time passed in the hot forming section during the time of hot forming does not exceed 8 mm/s and preferably does not undershoot a value of 5 mm/s.

The hot forming may advantageously be carried out by floating on a float bath, and the main surface is the main surface of the glass to be hot formed or being hot formed facing away from the float bath.

Preferably, the hot forming distance of section Hs extends in the flow direction of the glass that is to be hot formed or has at least partially been hot formed, from a first top roller involved in the hot forming, the location of which in the direction of flow or movement of the glass to be hot formed defines the beginning of the hot forming section Hs, to a last top roller, the location of which in the direction of flow or movement of the glass to be hot formed defines the end of the hot forming section Hs.

In a particularly preferred embodiment, the viscosity of the glass is between log ($\eta$/dPa·s)=4.8 and log ($\eta$/dPa·s)=5.5 at the location of the first top roller and thus at the beginning of the hot forming in section Hs, and is between log ($\eta$/dPa·s)=7.1 and log ($\eta$/dPa·s)=7.6 at the end of the hot forming and hence at the location of the last top roller.

At the tweel or control gate, a maximum viscosity of log ($\eta$/dPa·s)=4.0 was adjusted for the glass 8 in each case.

The width Bg, that is in particular the extent in X-direction of the glass 8, in particular glass ribbon 13 or glass substrate 13, produced from the glass 8 to be hot formed, is altered by less than 3% during the hot forming in section Hs.

Particularly preferably, in a method for producing a glass substrate for vehicle glazing, in particular for a windscreen of a vehicle which comprises hot forming of a borosilicate glass, at least in a hot forming section, in particular during stretching of the glass in the flow direction or longitudinal direction of movement of the glass, the glass to be hot formed is exposed to a forming gas atmosphere which contains a hydrogen content from 2 vol % to 14 vol %, preferably from 6 vol % to 8 vol %.

The other constituents of the forming gas atmosphere may include nitrogen and further inert gases.

Preferably, in the method for producing a glass substrate, the forming gas atmosphere is exchanged at least 15 times per hour.

Particularly advantageously, at least ⅔ of the forming gas atmosphere is intentionally discharged through extraction devices, also known as ventouts, at the hot end of the float bath.

If, in the method for producing a glass substrate, the oxygen partial pressure in the forming gas atmosphere as measured at the cold end of the float bath in the forming gas atmosphere is lower than $10^{-25}$ bar, this helps to mitigate particulate deposits, in particular on the upper surface facing away from the tin bath (main surface) of the hot-formed glass ribbon or glass substrate.

Surprisingly, it has been found that during the hot forming in section Hs, a depletion of sodium borate in a near-surface layer of the main surface of the glass ribbon or glass substrate is less than 30%, this near-surface layer extending down to a depth of not more than 10 μm in the glass ribbon or glass substrate.

In the preferred embodiments of the method for producing a glass substrate for vehicle glazing, a borosilicate glass is used for hot forming the glass substrate for vehicle glazing, which contains the following constituents (in wt %):

| | |
|---|---|
| $SiO_2$ | 70-87 |
| $B_2O_3$ | 7-25 |
| $Na_2O + K_2O$ | 0.5-9 |
| $Al_2O_3$ | 0-7 |
| CaO | 0-3. |

Particularly preferably, a borosilicate glass with the following composition is used:

| | |
|---|---|
| $SiO_2$ | 70-86 wt % |
| $Al_2O_3$ | 0-5 wt % |
| $B_2O_3$ | 9.0-25 wt % |
| $Na_2O$ | 0.5-5.0 wt % |
| $K_2O$ | 0-1.0 wt % |
| $Li_2O$ | 0-1.0 wt %; | and the composition specified above will also be referred to as glass 1 of borosilicate glass class 33 within the scope of the present disclosure;

or else a borosilicate glass, in particular an alkali borosilicate glass is used, which contains:

| | |
|---|---|
| $SiO_2$ | 78.3-81.0 wt % |
| $B_2O_3$ | 9.0-13.0 wt % |
| $Al_2O_3$ | 3.5-5.3 wt % |
| $Na_2O$ | 3.5-6.5 wt % |
| $K_2O$ | 0.3-2.0 wt % |
| CaO | 0.0-2.0 wt %. | and the composition specified above will also be referred to as glass 2 of borosilicate glass class 40 within the scope of the present disclosure.

With the method disclosed herein, the hot forming of the glass substrate advantageously results in a substantially wedge-shaped thickness variation K of the glass substrate which has a value of less than 100 μm and preferably a value of less than 40 μm over a length of 1 m perpendicular to the drawing direction.

Furthermore, due to the hot forming, the glass substrate may exhibit a warpage V with a value of less than 600 μm and in the case of preferably a value of less than 300 μm over a length of 1 m perpendicular to the drawing direction.

In preferred embodiments and with the hot forming, the glass substrate may be obtained with an average thickness from 0.3 mm to 5 mm, preferably a thickness from 0.7 to 3.8 mm, more preferably a thickness of about 0.7 mm or a thickness of about 2.54 mm, averaged over a surface area of the first and second main surfaces of the glass substrate for vehicle glazing of at least 10 cm*10 cm.

Generally, a drawing process can be used for producing a glass substrate for vehicle glazing for hot forming, in particular a float process, a down-draw process, and/or a fusion process, in particular an overflow fusion down-draw process.

The invention in particular also encompasses a glass substrate for vehicle glazing, which is or can be produced using the present invention, and a head-up display for motor vehicles and driver assistance systems.

The invention will now be described in more detail by way of preferred and particularly preferred exemplary embodiments and with reference to the accompanying drawings, wherein:

FIG. 5 shows abrasion traces obtained on a non-toughened glass substrate made of borosilicate glass in a Taber test according to ECE R43 at different rotational speeds;

FIG. 6 shows detailed views of the abrasion traces obtained on a non-toughened glass substrate made of borosilicate glass in a Taber test according to ECE R43 at different rotational speeds;

FIG. 7 shows a table with haze values of the abrasion traces obtained on a non-toughened glass substrate made of borosilicate glass in a Taber test according to ECE R43 at different rotational speeds;

Figure 16:
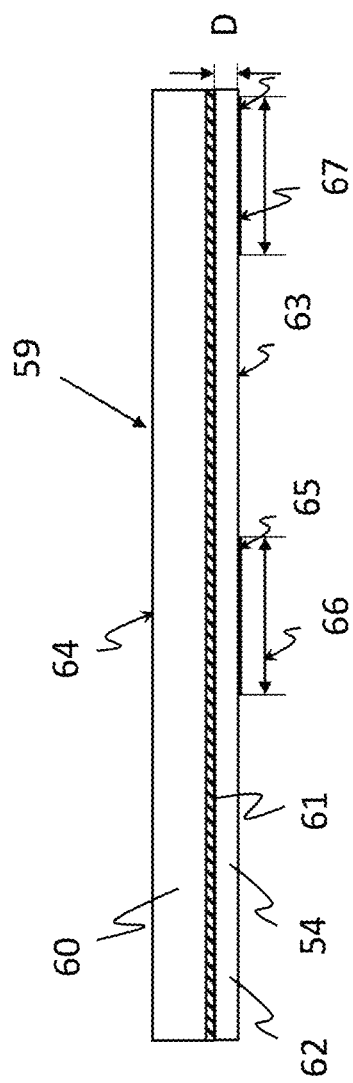
Figure 17:
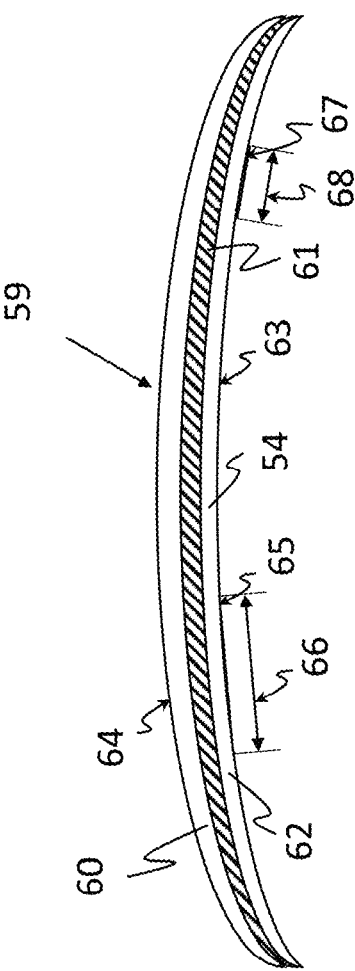

FIGS. 16 and 17 each show a schematic view of a laminated glass pane according to a preferred embodiment, each having a reflection surface for a head-up display and an area for an imaging optical sensor, in particular of a driver assistance system.

DETAILED DESCRIPTION OF PREFERRED EMBODIMENTS

In the following description of preferred and particularly preferred embodiments, the same reference numerals in the various figures designate the same or equivalent components of the respective apparatus disclosed herein.

In the context of the present disclosure, the term "vehicle glazing" encompasses glazing of vehicles such as, for example, vehicles operated on land, on or in the water, and in the air, but particularly preferred embodiments comprise glazing of motor vehicles, such as, for example, passenger cars or trucks or rail-bound vehicles.

The data on the thickness D of the glass substrate for vehicle glazing correspond to the distance between the two main surfaces of the glass substrate for vehicle glazing, as can be seen in FIG. 17, and have to be measured perpendicular to these main surfaces in each case, as shown by the two arrows next to the reference character D in FIG. 17.

The glass substrate, in particular the glass substrate made of borosilicate glass may be obtained by the hot forming preferably in an average thickness from 0.3 mm up to 5 mm, preferably in a thickness from 0.7 mm to 3.8 mm, most preferably in a thickness of about 0.7 mm or a thickness of about 2.54 mm, arithmetically averaged over a surface area of at least 10 cm*10 cm of the first and second main surfaces of the glass substrate.

Figure 1:
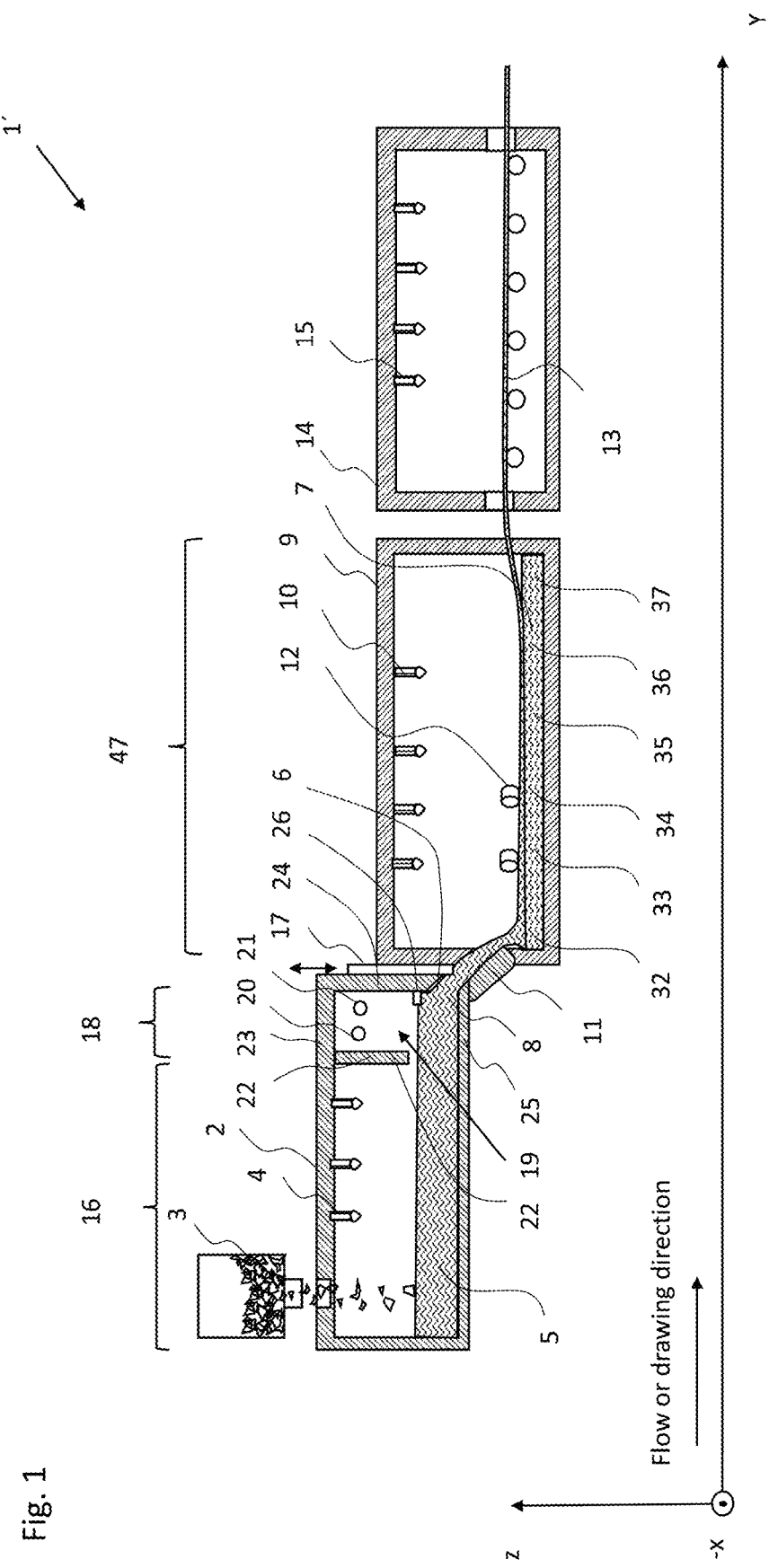
FIG. 1 is a schematic sectional view of an apparatus for producing a glass substrate for vehicle glazing for carrying out a method, with the sectional plane extending vertically approximately through the center of the apparatus.
Figure 2:
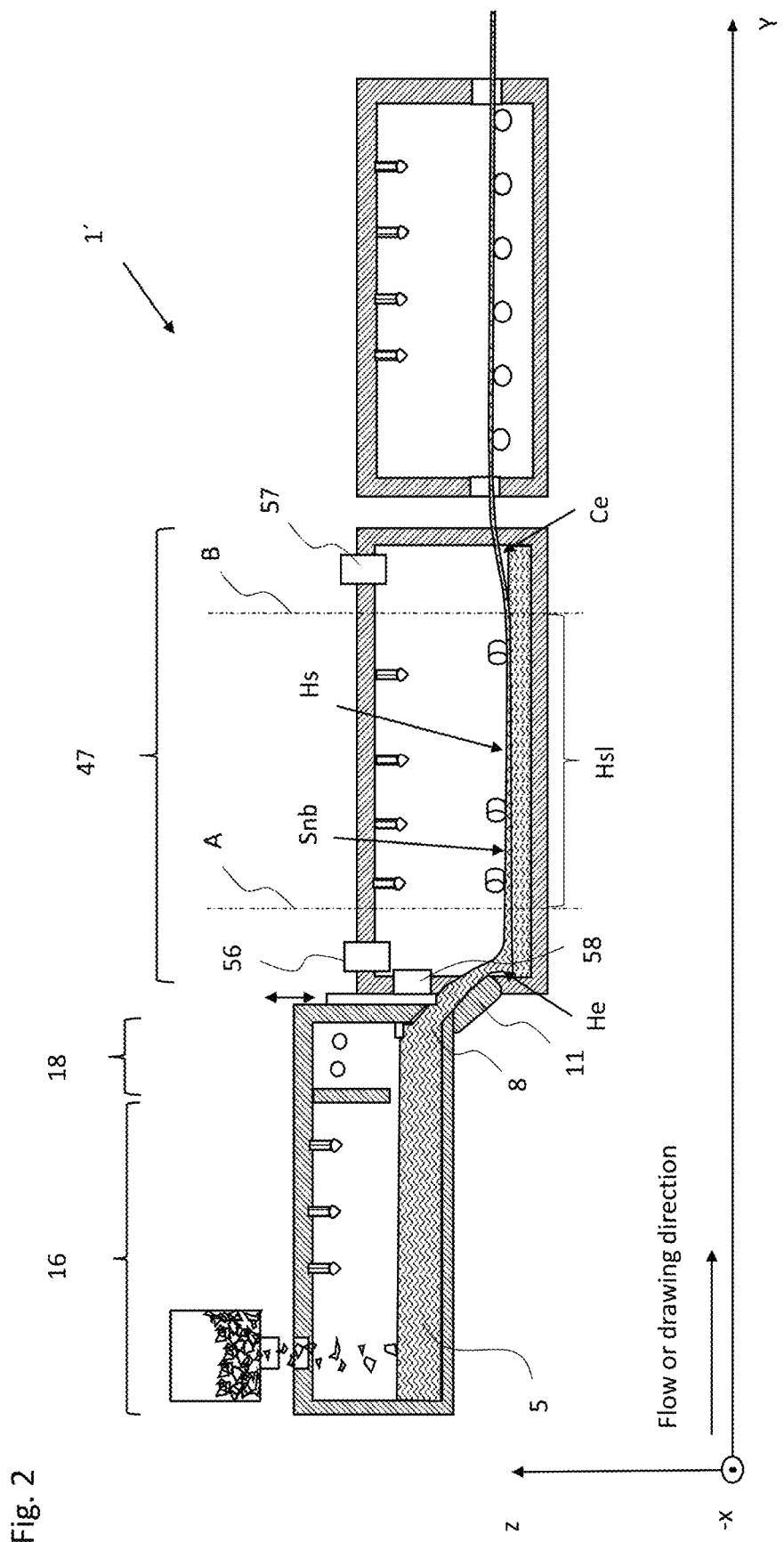
FIG. 2 shows the schematic sectional view of FIG. 1 in a greatly simplified form, in which the detail shown in FIG. 4 is indicated by sectional planes A and B.
Figure 3:
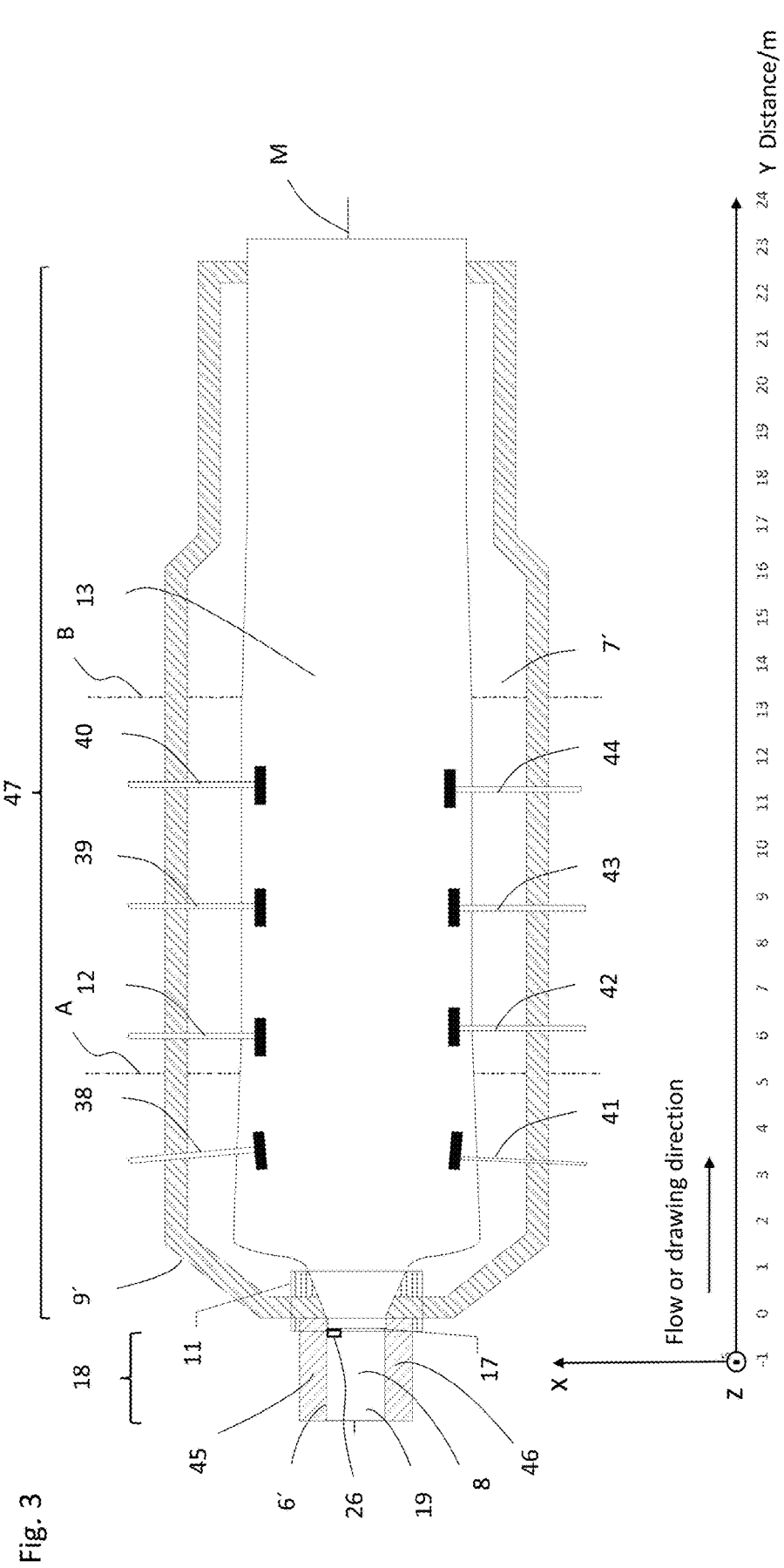
FIG. 3 is a schematic plan view of a portion of the apparatus shown in FIGS. 1 and 2 for producing a glass substrate for vehicle glazing, in particular a glass ribbon to be hot formed on a float bath, in which only some of the total number of top rollers that are used is exemplified to simplify the illustration.

This float system shown in FIGS. 1, 2, and 3 for carrying out the methods presently disclosed comprises a melting furnace 2, also referred to as a melting tank, to which a glass batch 3 to be melted is fed in known manner and is heated by burners 4 until a glass melt 5 of the desired composition is obtained. Further devices for homogenization of the molten glass will be known to a person skilled in the art and are therefore not described in more detail.

Through a channel 6, the molten glass of glass melt 5 reaches a float bath 7, usually under the influence of gravity, which float bath comprises liquid tin on which the glass 8 to be hot formed can spread laterally, as part of the hot forming process thereof under the influence of gravity thereby reducing its height.

For adjusting the temperature of the glass to be hot formed, the tin bath 7 may be contained in a float bath furnace 9 which is equipped with electrical ceiling heaters 10 that can be used to adjust the temperature of the glass to be hot formed.

Figure 4:
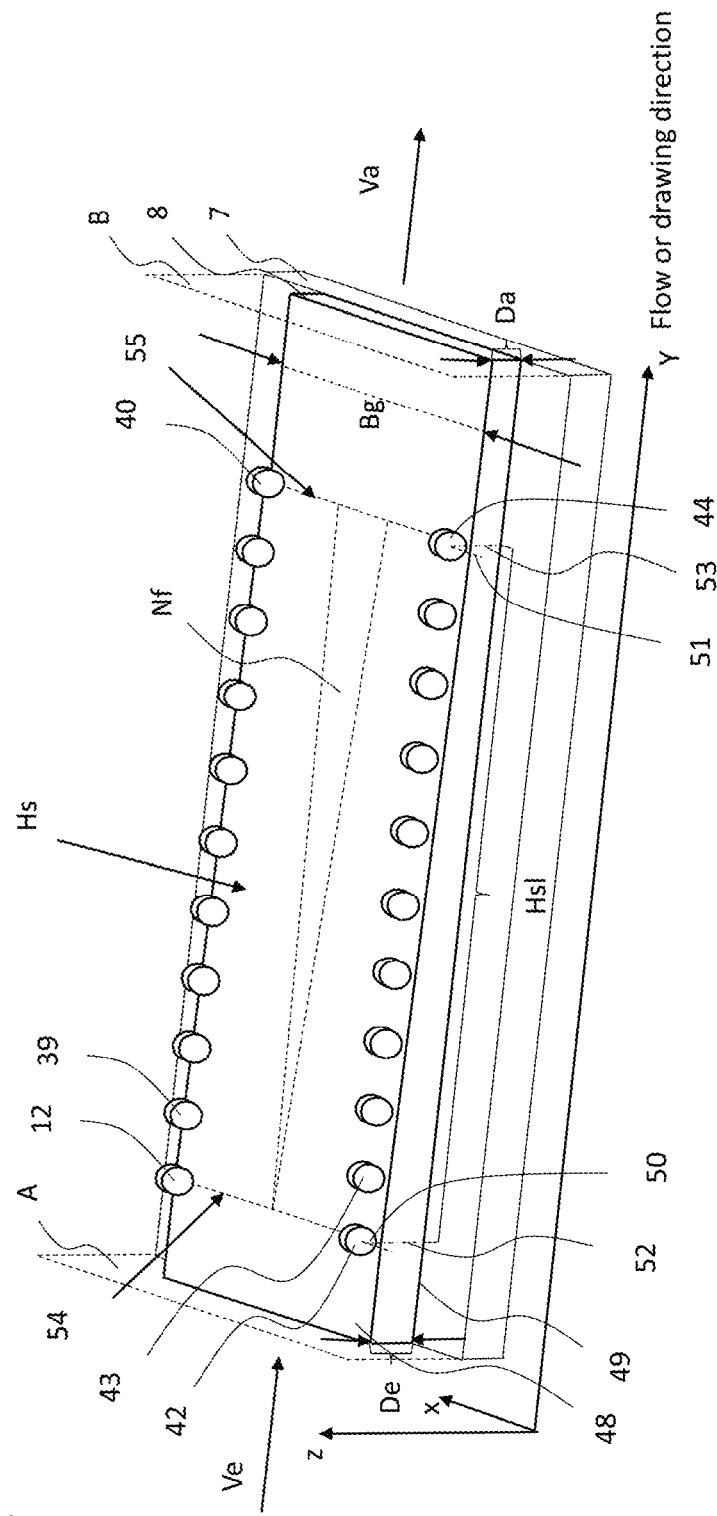
FIG. 4 shows a top view, seen obliquely from above, of a portion of the apparatus as shown in FIGS. 1 and 2 for producing a glass substrate for vehicle glazing, in the form of a section extending between sectional planes A and B.

When leaving the melting tank 2, the molten glass 8 to be hot formed is directed onto the tin bath 7 via an inlet lip 11 which extends obliquely downwards and is also referred to as a lip stone or spout, on which the glass already begins to spread. Roller-shaped top rollers 12 are used as drawing means to influence the glass ribbon 13 being formed on the tin bath 7 in its spreading movement, in a defined manner and from the lateral side, during further movement thereof. In FIG. 1, only two top rollers are illustrated by way of example, however, more than two of these top rollers may be provided and used, depending on requirements, as can be seen in FIGS. 2, 3, and 4, for example.

A top roller is a substantially roller-shaped body which is well known to the person skilled in the art and which contacts, with its outer annular shoulder, the main surface 48 of the glass 8 to be hot formed facing away from the tin bath, and exerts a respective force on the glass 8 to be hot formed by a rotary movement about its respective longitudinal or symmetry axis 50, 51. This symmetry axis 50, 51 is only shown for top rollers 42, 44, by way of example. In the context of the present disclosure, the term "top roller" may also be understood as an essentially roller-shaped transport device for the glass to be hot formed. In this case, the first top roller represents an essentially roller-shaped transport device for the glass to be hot formed at the beginning of the hot forming section Hs, and the last top roller represents an essentially roller-shaped transport device for the glass to be hot formed at the end of the hot forming section Hs.

With an outer annular shoulder of the respective top roller contacting a portion of the glass 8 to be hot formed, the glass is moved in a defined manner. Each top roller is motor-driven in a controllable, defined manner through an essentially rod-shaped shaft.

In the context of the present disclosure, location or position of the top roller, in particular in the flow direction Y of the glass 8, refers to the respective perpendicular 52, 53 from the respective axis of symmetry 50, 51 of the corresponding top roller 42, 44 in negative Z-direction to the surface, in particular to the main surface 48 of the glass 8 to be hot formed.

The position or location of the respective first top roller 12, 42 defines the entry of the glass 8 into the hot forming section Hs.

The position or location of the respective last top roller 40, 44 defines the exit of the glass 8 from the hot forming section Hs.

For the sake of simplicity, when the first top roller is mentioned in the context of the present disclosure, this means the pair of top rollers in each case, for example top rollers 42, 12 which are located at the same position as seen in the flow direction, and when the last top roller is mentioned, this means the pair of top rollers in each case, for example top rollers 44, 40 which are located at the same position as seen in the flow direction or Y-direction.

The location of entry of the glass 8 into the hot forming section Hs is therefore apparent based on the dashed line 54, whereas the location of exit of the glass 8 from the hot forming section Hs is indicated by the dashed line 55.

Within the scope of the present disclosure, the length Hsl of the hot forming section Hs is understood to be the distance, in the flow direction or Y-direction, between the perpendicular 52 from the first top roller 42 and the perpendicular 53 from the last top roller 44.

After having been hot formed, the glass ribbon 13 may optionally be transferred into an annealing lehr 14, which may also have electrical ceiling and bottom heaters 15 in order to subject the glass ribbon to a defined temperature decrease.

Once the glass ribbon 13 has left the annealing lehr 14, it is then available for further processing, in particular for being cut into glass panes or glass substrates.

In order to be able to illustrate more clearly spatial relationships of particular assemblies or properties, such as of glasses to be hot formed or of glass substrates in the following description of preferred embodiments, reference is first made to the Cartesian coordinate system shown in FIGS. 1, 2, 3, and 4, which defines orthogonal X-, Y-, and Z-directions to which all the information in the various figures will refer to.

The X- and Y-directions span a plane which extends horizontally and therefore substantially parallel to the surface of the tin bath 7. The Z-direction extends upwards, perpendicular to this plane, and thereby defines the normal direction with respect to the glass ribbon 13.

Referring now to FIG. 1 which shows the float system designated by reference numeral 1 as a whole, as an apparatus for producing a glass substrate for vehicle glazing, which comprises all the devices described with reference to FIGS. 2, 3, and 4.

This includes the melting tank or melting furnace 2 as a device for melting 16, a feeding device for the glass batch 3, and the burners 4. Furthermore, the melting tank 2 has a channel 6 for transferring the molten glass 8 to be hot formed onto the tin bath 7.

By way of example, the control gate 17, i.e. the component for throughput control of the glass stream also known as a tweel is located downstream of channel 6. By shifting the control gate or tweel 17, i.e. the throughput control component 17, in the direction of the double arrow shown next to reference numeral 17, the cross section of channel 6 can be narrowed or enlarged, thereby controlling and in particular adjusting in a defined manner the amount of molten glass 8 to be hot formed that is exiting the tank 2 per unit time. Furthermore, a feeder channel may be provided between melting tank 2 and float bath furnace 9, in particular upstream of tweel 17, which in this case defines the channel 6, in particular also over a longer distance than shown in FIG. 1. A more detailed description of flow rate control can be found in DE 10 2013 203 624 A1 of the present Applicant, which is incorporated into the subject matter of the present application by reference.

A device 18 for defined adjustment of the viscosity of the molten glass 8 to be hot formed is provided upstream of the throughput control component 17 and upstream of the lip stone or spout 11, as seen in the flow direction of the molten glass 8 to be hot formed.

This device 18 for defined adjustment of the viscosity comprises a chamber 19 which is separated from the melting tank 2 or may else form part thereof, and which receives the molten glass 8 to be formed into a glass substrate for adjusting the viscosity thereof in a defined manner.

Furthermore, the device 18 for defined adjustment of the viscosity comprises fluid flow areas 20, 21, in particular areas through which water flows, which absorb heat from the glass 8 to be hot formed and which may be configured in the form of a metallic pipe system. This metallic pipe system may also be dyed for better heat absorption, or may be provided with a temperature-resistant paint on the surface thereof.

Alternatively or additionally, the walls 22, 23, 24, and 25 of the chamber 19 may absorb heat from the glass 8 to be hot formed, by setting their temperature in a defined manner, for example through further cooling means.

The chamber 19 with its walls 22, 23, 24, and 25 may else be provided spatially separated from the melting tank 2 and may have high-temperature resistant metallic walls to provide improved heat dissipation.

As described above, the device 18 for defined adjustment of the viscosity comprises at least one cooling means that can be used to adjust, in a defined manner, the temperature and therefore also the viscosity of the glass 8 to be hot formed.

Non-contact temperature measurements and, alternatively or additionally, direct temperature measurements in contact with the glass to be measured are known to a person skilled in the art. In the context of the present disclosure, such sensors are described in conjunction with the sensing device or unit 26, for example.

The sensing device or unit 26 may be in direct contact with the glass and may thus perform a direct temperature measurement, or it may comprise a radiation measuring device which identifies the temperature by capturing the spectrum emitted by the glass 8 to be hot formed and on the basis of the spectrum itself and/or the intensity of the emitted radiation.

The apparatus 1 for producing a glass substrate for vehicle glazing comprises a device 47 for hot forming, which will be described in more detail below and which is located downstream of the device 18 for defined adjustment of the viscosity as seen in the flow or drawing direction and receives the glass 8 to be hot formed through the lip stone or spout 11.

The lip stone or spout PI 11 directs the glass 8 to be hot formed onto a tin bath 7 which is accommodated in the float bath furnace 9.

As can also be clearly seen from FIG. 3, further top rollers 38 to 44 are arranged next to the top roller 12 above the glass ribbon 13 that is being formed on the tin bath 7, for mechanically moving the glass ribbon 13.

The number of top rollers shown in FIG. 3 is only meant by way of example here, since 10 to 12 pairs of top rollers are preferably used in preferred embodiments of the invention.

Top rollers 41 and 38 are used to adjust the width of the glass ribbon Bg or glass substrate 13 resulting from the hot forming and are optional, since the width Bg can also be adjusted in another way, for example by controlling the amount of glass 8 that is provided for the hot forming.

FIG. 3 furthermore shows an alternative or additional embodiment of the device 18 for defined adjustment of the viscosity. The molten glass 8 is located in a channel 6 extending from the melting tank 2, not shown in FIG. 3, to the float bath furnace 9. The walls 45, 46 of channel 6 are made of a high-temperature resistant metal such as platinum, which may else be provided on a mineral refractory material as a metallic layer. By adjusting the temperature of the walls 45, 46, in a defined manner, heat can be withdrawn from the glass 8 and the temperature and so the viscosity thereof can be adjusted in a defined manner as well. In this embodiment, the sensing unit 26 described above may again preferably be disposed in the vicinity of the tweel 17.

Above, a drawing device was described for the device 47 for hot forming, which comprises a float device, in particular a float bath furnace 9 with a tin bath 7.

In a further embodiment, however, the invention may also comprise a down-draw drawing device, in particular an overflow down-draw fusion drawing device which is not shown in the figures, and the method may not only comprise a float process but also a down-draw process, in particular an overflow fusion down-draw process.

The method presently disclosed will now be described by way of a float process as an example.

FIG. 4 shows a section extending between sectional planes A and B of the apparatus 1 for producing a glass substrate for vehicle glazing, in particular for a windscreen of a vehicle, in which only the glass 8 to be hot formed and the float bath 7 in the form of a tin bath are shown, for the sake of better recognizability.

The glass 8 arrives from the left-hand side of FIG. 4 at an entry velocity Ve and moves in the flow direction toward the first top roller 42, 12, where the hot forming into a glass substrate for vehicle glazing, in particular for a windscreen of a vehicle as disclosed herein begins. This velocity corresponds to the velocity of the glass 8 on the first top roller 42, 12, V-TR1. Downstream of the last top roller 40, 44, that is after having been hot formed into a glass substrate for vehicle glazing, the glass 8 continues to move in the flow direction, at exit velocity Va and with an exit thickness Da. This exit velocity is also referred to as idle velocity or idle speed.

When merely "hot forming" is mentioned in the context of the present disclosure for the sake of linguistic simplicity, this means hot forming into a glass substrate for vehicle glazing along hot forming section Hs, which will be described in more detail below, while further hot forming steps may already have been occurred before the first top roller has been reached, for example when the glass 8 was poured onto the float bath 7, where the glass can spread and flatten out and assume its equilibrium thickness Dg of about 7 mm±1 mm.

After the hot forming, the glass 8 has an exit thickness Da which it will have assumed downstream of the last top roller 40, 44.

During the entire hot forming into a glass substrate for vehicle glazing between the first top roller 42, 12 and the last top roller 40, 44, i.e. within section Hs, the glass 8 has a width Bg, i.e. an extension Bg in X-direction, which changes by less than 3% in X-direction during this hot forming. This can be ensured by adjusting the rotational speed and rotation angle along the axis of symmetry (rotational axis) of the respective top roller. In particular, the angle of the respective symmetry axis of the corresponding top roller can be varied such that more or less strong contributions of movement of the glass 8 to be hot formed or of portions of the glass ribbon 13 are resulting in the X-direction during the transport of glass 8 to be hot formed, in particular along hot forming section Hs.

During this hot forming, a reduction of the thickness of the glass 8 from its entry thickness De at the location of the first top roller 42, 12, which in preferred embodiments corresponds to the equilibrium thickness Dg thereof, to its exit thickness Da, causes the main surfaces 48, 49 which extend parallel to one another and define the largest surfaces of the glass 8, to enlarge, in particular by stretching.

Thereby, a new surface area Nf is formed, for example on the main surface 48 facing away from the tin bath 7, the size of which is indicated by a triangle in dashed lines, only for illustration purposes, in order to simply illustrate the size of this new formation of the new surface area Nf.

Actually, however, this new surface area Nf forms at any location of the two main surfaces 48, 49 and, if a threshold value is exceeded and the surface of this new surface area Nf forms too quickly, this may cause microscopic cracks to arise which will then impair the hot-formed surface, in particular its strength.

Furthermore, this newly formed surface area now comes into contact with the surrounding atmosphere for the first time, which consists of a forming gas atmosphere with defined properties, as will be described in more detail below. With this first contact, an aging process begins for this newly formed surface area.

Moreover, the glass which reaches the surface, in particular the main surface 48, in such microscopic cracks may be warmer than the glass which has otherwise cooled down on the main surface 48, and may therefore be more prone to react with the surrounding atmosphere.

For the formation of the new surface area Nf during the time t during which the glass 8 is moved along hot forming section Hs, which extends from the location of the first top roller 42, 12 to the location of the last top roller 40, 44, the following applies:

$$Nf/t = |Ve - Va| * Bg.$$

This is because the surface area Fe entering the hot forming section per time interval dt is, for example:

$$Fe/dt = Ve * Bg,$$

and the surface area Fa emerging from the hot forming section per time interval dt is, for example:

$$Fa/dt = Va * Bg,$$

whereby, then, the new surface area Nf newly formed during the time t of hot forming is:

$$Nf/t = Fe/dt - Fa/dt = Ve * Bg - Va * Bg = |Ve - Va| * Bg.$$

In this model, lateral beads of the glass 8 are intentionally not taken into account, since they do not essentially change during the hot forming in relation to the mass of the rest of the glass 8 and hence an error compared to the actually obtained new surface area remains less than approximately 1%.

Now, if this surface area Nf newly formed during the time t of hot forming is divided by the length Hsl of the hot forming section Hs, the result is a value which clearly describes the aging of the new surface area during hot forming thereof and consequently will be referred to as aging velocity Av in the context of the present disclosure.

The following applies to this aging velocity:

$$Av = Nf/(t*Hsl) = (|Ve - Va| * Bg)/Hsl.$$

The inventors have found that, surprisingly, this value of the aging velocity Av is a good criterion for the qualities of the surfaces, in particular of the main surface 48 which forms on the side facing away from the tin bath 7, obtained by the method presently disclosed.

According to the invention, in the method for producing a glass substrate for vehicle glazing, in particular for a windscreen of a vehicle, which comprises hot forming of a borosilicate glass, an aging velocity Av of the glass 8 to be hot formed does not exceed 10 mm/s and an aging velocity Av of the glass preferably does not undershoot 3 mm/s in a hot forming section, at least during stretching of the glass 8 in the flow or longitudinal direction of movement of the glass 8, wherein the following applies to the aging velocity:

$$Av = |Ve - Va| * Bg / Hsl$$

where
Ve is the entry velocity of the glass into hot forming section Hs, preferably measured in m/h;
Va is the exit velocity of the hot-formed glass from the hot forming section Hs, preferably measured in m/h;
Bg is the width of the glass to be hot formed in the hot forming section Hs, preferably measured in m;
Hsl is the length of hot forming section Hs along which the glass is stretched, preferably measured in m; and
Av is the aging velocity, preferably measured in mm/s.

Furthermore, according to the invention, a method for producing a glass substrate for vehicle glazing, in particular for a windscreen of a vehicle is disclosed, which comprises hot forming of a borosilicate glass, wherein in a hot forming section, at least during stretching of the glass 8 in the flow direction or longitudinal direction of movement of the glass 8, a ratio of the surface area of a main surface which is newly formed during the hot forming process, namely the new surface area Nf of the glass 8 to be hot formed, to the length of the hot forming section in the flow direction or longitudinal direction of movement of the glass 8 and to the time t passed in the hot forming section Hs during the time of hot forming does not exceed 10 mm/s and preferably does not undershoot value of 3 mm/s, wherein the following applies to this ratio:

$$Nf/(t*Hsl) = |Ve - Va| * Bg / Hsl$$

where
Ve is the entry velocity of the glass into the hot forming section Hs, preferably measured in m/h;
Va is the exit velocity of the hot-formed glass from the hot forming section Hs, preferably measured in m/h;
Bg is the width of the glass to be hot formed in the hot forming section Hs, preferably measured in m;
Hsl is the length of the hot forming section Hs along which the glass is stretched, preferably measured in m;
Nf is the surface area of a main surface of the glass to be hot-formed, which is newly formed during the hot forming in the hot forming section, preferably measured in $m^2$; and t is the time the glass to be hot formed passes in the hot forming section Hs, preferably measured in s.

Particularly advantageously, in the method for producing a glass substrate for vehicle glazing, an aging velocity Av of the glass 8 to be hot formed does not exceed 8 mm/s and an aging velocity Av of the glass preferably does not undershoot 5 mm/s; and/or a ratio of the surface area newly formed during the hot forming process of a main surface, i.e. the new surface area Nf of the glass 8 to be hot formed, to a length of the hot forming section in the flow direction or longitudinal direction of movement of the glass 8 and to the time passed in the hot forming section during the time of hot forming does not exceed 8 mm/s and preferably does not undershoot a value of 5 mm/s.

Generally, the hot forming distance in section Hs extends in the flow direction of the glass 8 that is to be hot formed or has at least partially been hot formed, from a first top roller 42, 12 involved in the hot forming, the location of which in the direction of flow or movement of the glass to be hot formed defines the beginning of the hot forming section Hs, to a last top roller 40, 44, the location of which in the direction of flow or movement of the glass 8 to be hot formed defines the end of hot forming section Hs.

In the method described herein, the viscosity of the glass 8 is between log $(\eta/dPa \cdot s)=4.8$ and log $(\eta/dPa \cdot s)=5.5$ at the location of the first top roller 42, 12 and hence at the beginning of the hot forming in section Hs, and is between log $(\eta/dPa \cdot s)=7.1$ and log $(\eta/dPa \cdot s)=7.6$ at the end of the hot forming and hence at the location of the last top roller 40, 44.

The width Bg, and hence in particular the extent of the glass 8, in particular glass ribbon 13 or glass substrate 13 resulting from the glass 8 to be hot formed changes by less than 3% in the X-direction during the hot forming in section Hs. This can in particular be achieved by aligning the respective axis of symmetry or rotation of the corresponding top roller.

In the method for producing a glass substrate for vehicle glazing, in particular for a windscreen of a vehicle, which comprises hot forming of a borosilicate glass, the glass 8 to be hot formed is exposed to a forming gas atmosphere which contains a hydrogen content from 2 vol % to 14 vol %, preferably from 6 vol % to 8 vol %, at least in a hot forming section, in particular during stretching of the glass 8 in the flow direction or longitudinal direction of movement of the glass 8.

The other constituents of the forming gas atmosphere may include nitrogen and further inert gases.

For this purpose, the apparatus 1 comprises gas feeding devices 56, 57 that are used to introduce the appropriately conditioned forming gas into the space above the section Hs of the device for hot forming 47 and thus above the upper main surface 48, see for example FIG. 2.

In this case, it is ensured that the forming gas atmosphere is exchanged at least 15 times per hour, by introducing an appropriate amount, in particular an appropriate volume of forming gas.

According to the method, at least ⅔ of the forming gas atmosphere is intentionally removed at the hot end of the float bath by extraction devices 58, also referred to as ventouts. Here, hot end of the float bath means the end of the float bath near the lip stone 11, in the flow direction.

At the opposite end of the float bath 7 in the flow direction of the glass ribbon 13, that is to say at the end of the float bath 7 referred to as the cold end, Ce, the oxygen partial pressure of the forming gas atmosphere measured there is lower than 10-25 bar.

This oxygen partial pressure can be ensured by an appropriate hydrogen content in the forming gas and an appropriately high exchange of the forming gas atmosphere, for example as described above.

The depletion of sodium borate in a near-surface layer Snb of the main surface 48 of the glass ribbon or glass substrate 13 was less than 30% here, and this near-surface layer Snb extends down to a depth of not more than 10 μm in the glass ribbon or glass substrate 13. In FIG. 2, this layer Snb is represented by a corresponding arrow which indicates the position of this layer in the main surface 48.

A method that is particularly advantageous for producing a glass substrate for vehicle glazing, in particular for a windscreen of a vehicle, comprises hot forming of a borosilicate glass, and in particular reducing the evaporation of the boron content during the hot forming as described above for the reduction of the sodium borate release or depletion in sodium borate in the surface layer Snb.

It has been found that particularly resistant main surfaces 48 could be obtained with the values for the aging rate and for the formation of new surface area as specified in claims 1, 2, and 3.

By way of example, hot forming with the presently disclosed method was performed with the respective values given in Table 1 below, except for the values listed in the first row of this table, which do not correspond to values according to the invention but to conventional values.

TABLE 1

| Thickness D | Change of glass ribbon velocity Ve-Va | FG Length Hsl | Br Width Bg | New surface area/h Nf/t | Aging velocity Av | |
|---|---|---|---|---|---|---|
| mm | m/h | m | m | m²/h | mm/s | m/h |
| 1.1 | 138.2 | 7.7 | 2.73 | 377.3 | 13.6 | 49.0 |
| 1.75 | 93.1 | 7.7 | 2.76 | 257.0 | 9.3 | 33.4 |
| 2 | 73.4 | 7.7 | 2.72 | 199.6 | 7.2 | 25.9 |
| 2 | 89 | 7.7 | 2.7 | 240.3 | 8.7 | 31.2 |
| 2 | 88.5 | 7.7 | 2.75 | 243.4 | 8.8 | 31.6 |
| 2.75 | 56.9 | 7 | 2.75 | 156.5 | 6.2 | 22.4 |
| 3.3 | 44.8 | 6.3 | 2.66 | 119.2 | 5.3 | 18.9 |
| 3.3 | 54.9 | 6.3 | 2.68 | 147.1 | 6.5 | 23.4 |
| 3.3 | 57.6 | 6.3 | 2.68 | 154.4 | 6.8 | 24.5 |

For a better understanding of this table and its values, the following equations were used for the above data, with the conversion factors belonging to the respective measured variables as follows:

$$Nf/t = |Ve - Va| * Bg$$

$$Av \ [mm/s] = Nf/(t*Hsl*3.6) = (|Ve - Va|*Bg)/(Hsl*3.6)$$

$$Av \ [m/h] = Nf/(t*Hsl) = (Ve - Va)*Bg)/(Hsl) = Av \ [mm/s]*3.6.$$

In Table 1 above, D is the thickness, given in mm; Da is the exit thickness of the hot-formed glass; Ve-Va is the change in the velocity of the glass ribbon, measured in m/h, i.e. the difference (absolute value) between the entry velocity Ve and exit velocity Va; Hsl is the FG length, measured in m; is the Br width of the glass ribbon to be hot formed and of the hot formed glass ribbon, measured in m; the value of Nf/t is the new surface area per hour, measured in m²/h; Av is the aging velocity given in mm/s in the first column and in m/h in the second column.

The values given in the first line of Table 1 and printed in bold for distinguishing purposes were obtained with values of a conventional hot forming process, whereas for the other values specified in this table the method of the invention was performed and the improved properties of the invention were obtained.

The advantageous results obtained with the method disclosed herein will now be described in more detail by way of several measuring processes.

FIG. 5 shows the wear marks or abrasion traces obtained on a non-toughened borosilicate glass substrate in a Taber test according to ECE R43 for different rotational speeds.

FIG. 6 shows detailed views of the abrasion traces obtained on the non-toughened borosilicate glass substrate in the Taber test according to ECE R43 for different rotational speeds, and FIG. 7 is a table with haze values of the abrasion traces obtained in the Taber test according to ECE R43 for different rotational speeds on the non-toughened borosilicate glass substrate 13 produced according to the present method.

The haze value is a measure of the cloudiness of transparent samples, for example of transparent glass substrates on which the measurements disclosed herein were performed. This value describes the proportion of transmitted light that is scattered forward by the irradiated sample. The haze value thus quantifies in particular material defects in the surface or structure, which may impair the clear view.

The method for measuring the haze value in transmission is specified in the ASTM D 1003 and ASTM D1044 standards and comprises wide angle scattering, i.e. scattered light deviating from the transmitted light beam by more than 2.5°. The method for determining the haze value in reflection is specified in ASTM E430 and comprises scattered light deviating from the light beam emitted (reflected) at 20° by more than 0.9°.

The haze values measured here reveal high scratch resistance or abrasion resistance for the borosilicate glass substrates produced according to the inventive method.

A test setup for measuring the scratch resistance of different glasses is carried out in a manner known to the person skilled in the art, using a Knoop diamond with a constant normal force $F_n$. In this case, the Knoop diamond is moved over the upper main surface 48 of the glass substrate with a constant normal force $F_n$.

Figure 8:
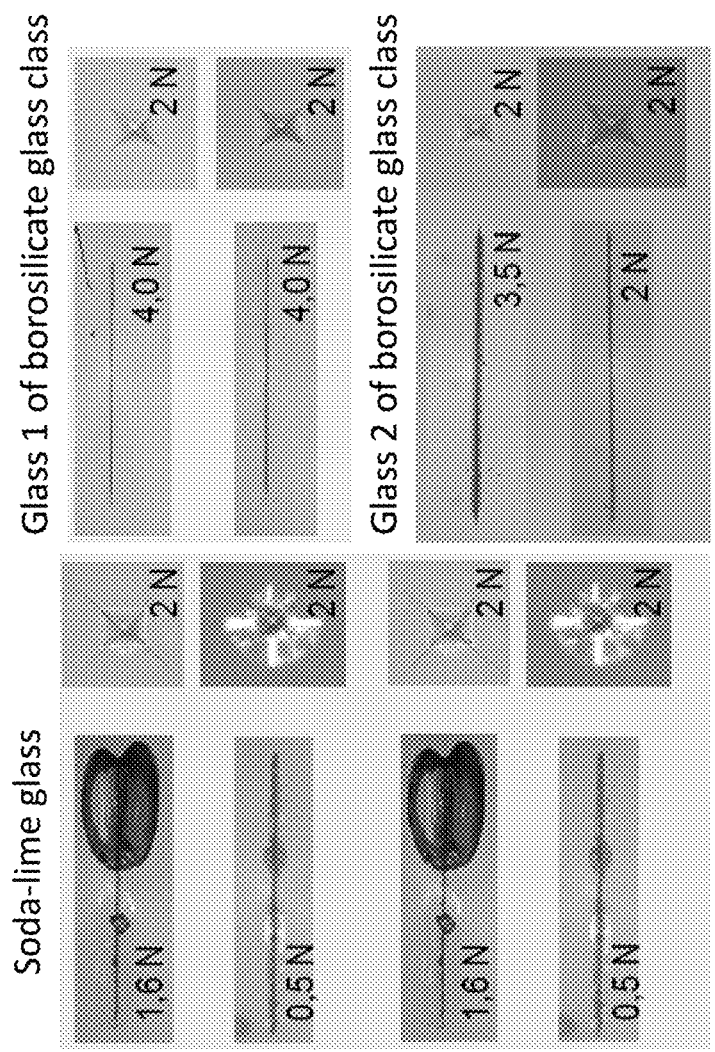
FIG. 8 shows results of tests performed on a non-toughened borosilicate glass and a non-toughened soda-lime glass using a Knoop diamond, where two results can be seen, first the respective results of a scratch test with a Knoop indenter on the left side, and the respective results of an indenter test with a Vickers indenter at a force of 2 N on the right side.
Figure 9:
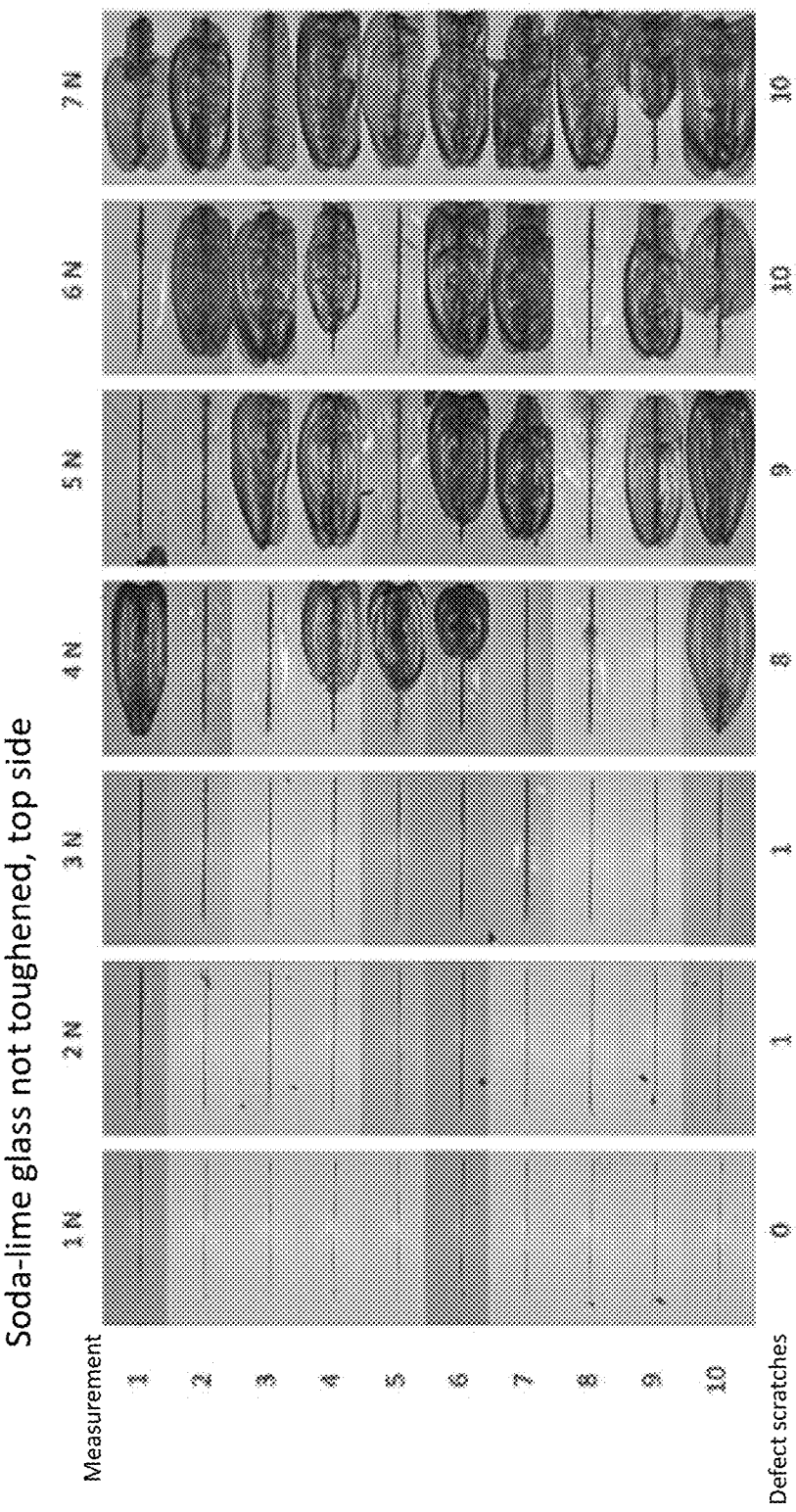
FIG. 9 shows a detailed view of the results of the scratch test illustrated in FIG. 8 at different normal forces $F_n$, for the soda-lime glass.
Figure 10:
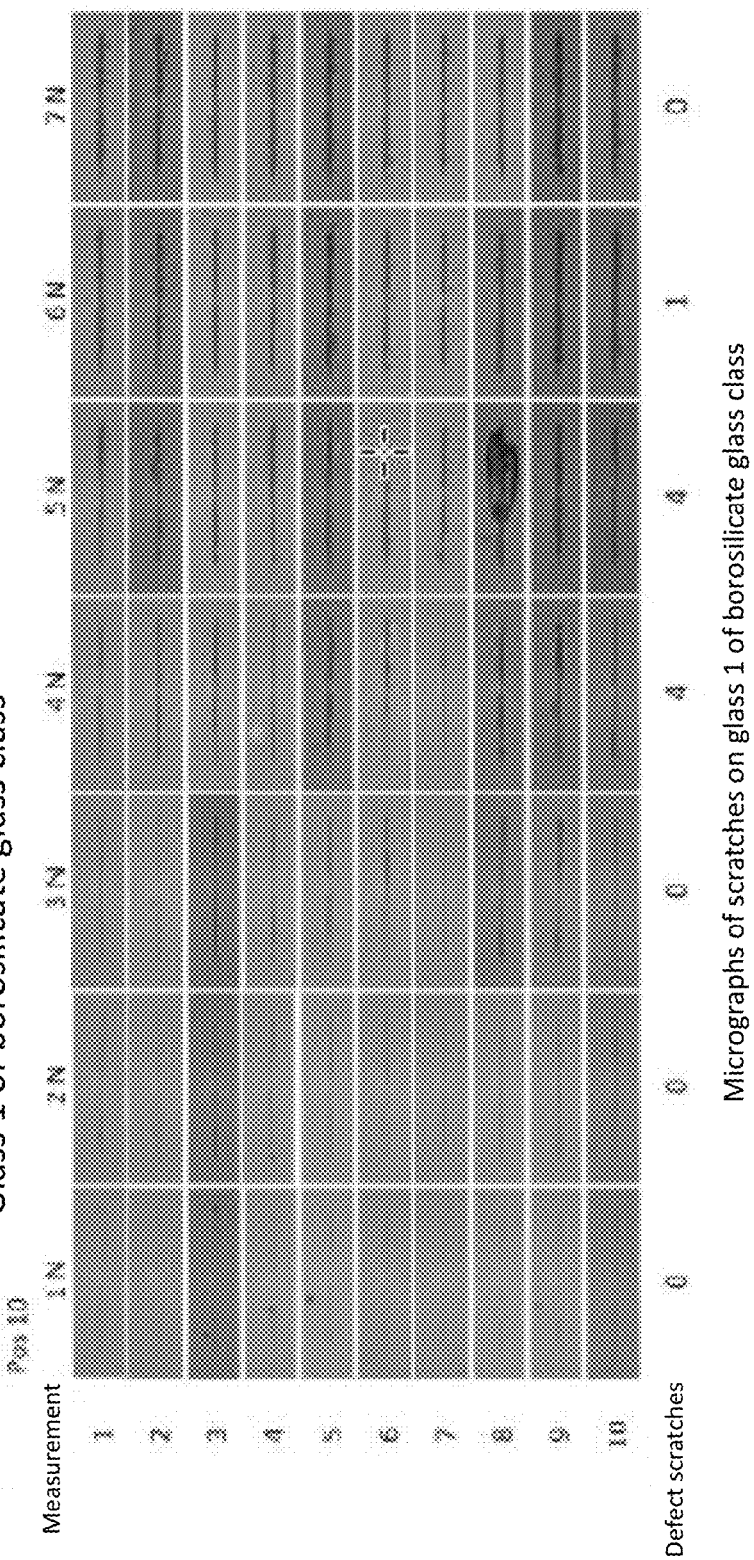
FIG. 10 shows a detailed view of the results of the scratch test illustrated in FIG. 9 at different normal forces $F_n$, for the borosilicate glass.

The results of these measurements are shown in FIGS. 8 to 10, which also specify the values of normal force $F_n$ associated with the respective measurement as well as the respective glass.

FIG. 8 shows the results of the tests performed with the test setup comprising the Knoop diamond for several normal forces $F_n$: with a force of 4 N, and 3.5 N as well as 4 N, respectively, on a non-toughened borosilicate glass, and with a force of 0.5 N or 1.6 N on a non-toughened soda-lime glass. FIG. 9 shows a detailed view of the results of the tests performed with the test setup comprising the Knoop diamond at various normal forces $F_n$ on the soda-lime glass, and FIG. 10 shows a detailed view of the results of the tests performed with the test setup comprising the Knoop diamond at various normal forces $F_n$ on the borosilicate glass.

It is obvious that the borosilicate glass produced in accordance with the inventive method exhibits much less damage than the soda-lime glass tested in parallel.

Figure 11:
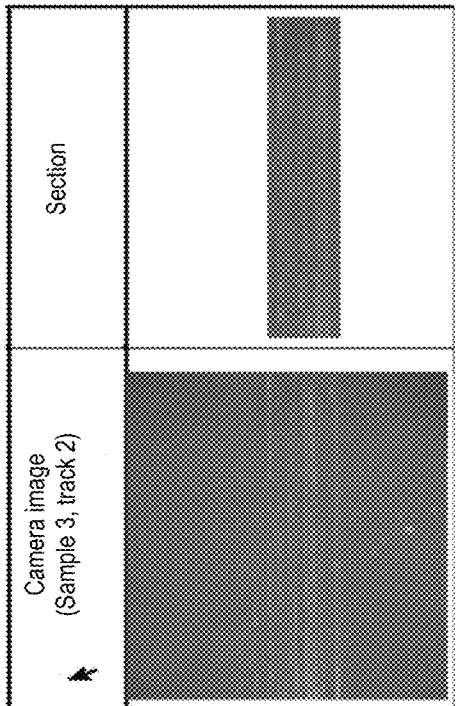
FIG. 11 shows results of a scrub test which simulates the wiping operation of a motor vehicle windscreen wiper, for a borosilicate glass, in the form of abrasion traces.

FIG. 11 shows the results of a scrub test which simulate the wiping operation of a motor vehicle windscreen wiper, on a borosilicate glass, in the form of abrasion traces.

The scrubbing medium used was P400 KK114F emery paper (normal corundum (A) from VSM), at a stroke rate of 50.

In the case of this simulated strain of a windscreen wiper, a stroke means that the sample surface is wiped over twice (back and forth), as the windscreen wiper of a motor vehicle would do.

For approximating this strain during windscreen wiping operation, the pressure load was calculated as follows: The contact pressure of a windscreen wiper is 17 N/m according to vehicle manufacturers specifications. With a wiper blade length of approx. 0.5 m and a wiper blade width of 2 mm, a pressure of approx. 0.85 N/cm² results. Converted to a scrub head area of 2 cm², a load weight of 173 g has to be used for testing. The approximate dead weight of the scrub head in the measurements shown here was approximately 179 g.

Figure 12:
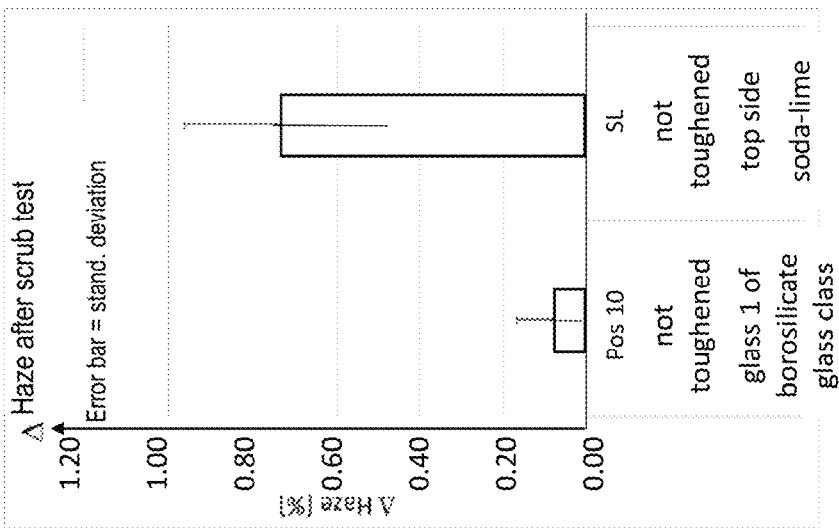
FIG. 12 is a table of haze values of abrasion traces obtained for a non-toughened borosilicate glass in the scrub test which simulates the typical effects of windscreen wiping operation in a motor vehicle.

FIG. 12 shows a table with haze values of the abrasion traces obtained for a non-toughened borosilicate glass in the scrub test which simulates the typical effects of windscreen wiping operation of a motor vehicle.

The borosilicate glass produced in accordance with the inventive method proved to be extremely resistant to these simulated impacts of a windscreen wiping process in this test.

Figure 13:
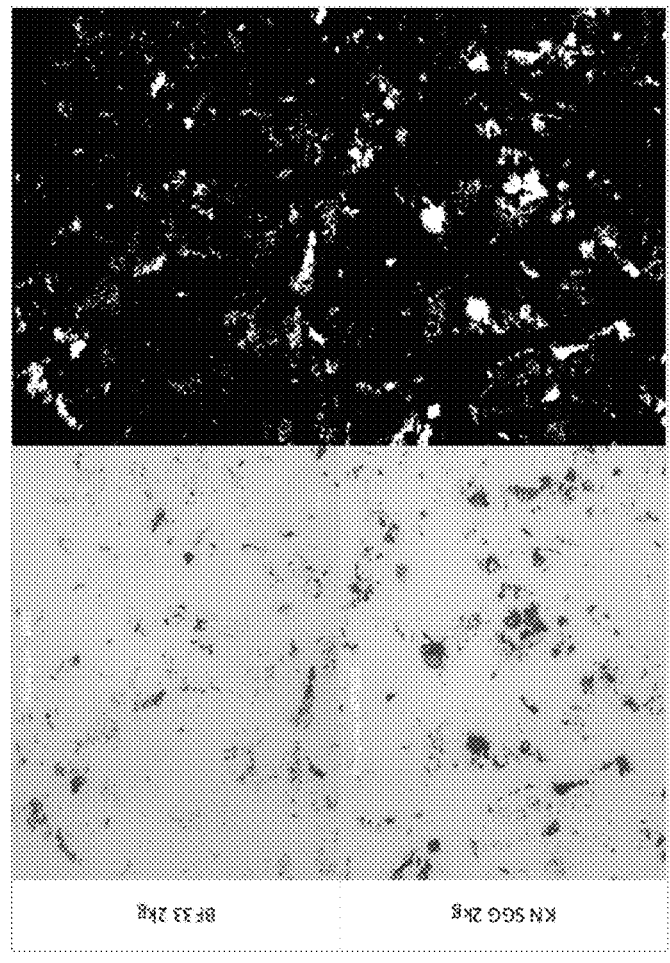
FIG. 13 illustrates the influence of optical disturbances that have occurred in a trickling test for a borosilicate glass and for a soda-lime glass, and their optical assessment in the form of an analysis of the respective damaged surface area.

FIG. 13 illustrates the influence of optical disturbances caused in a trickling test with gritting material on a borosilicate glass and on a soda-lime glass, as well as optical assessment in the form of an analysis of the respective damaged surface area.

Figure 14:
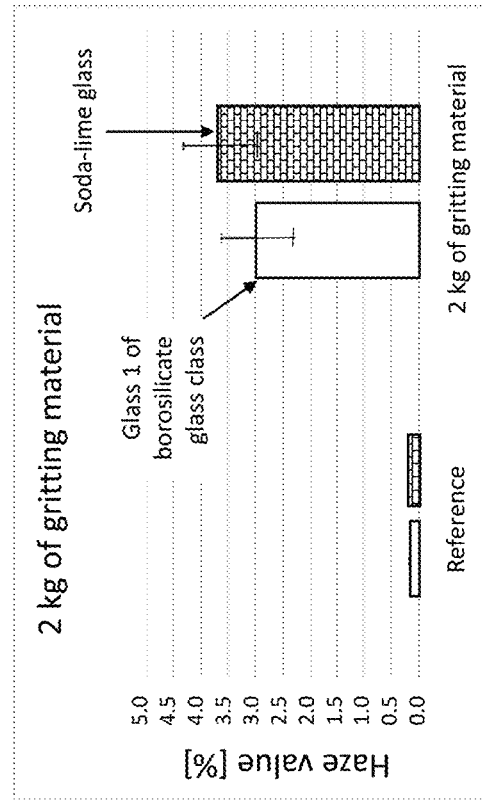
FIG. 14 shows a table of haze values of the optical disturbances which occurred in the trickling test for a borosilicate glass and for a soda-lime glass.

FIG. 14 shows a table with haze values of the optical disturbances caused in the trickling test with gritting material on a borosilicate glass produced according to the inventive method and on a soda-lime glass.

Figure 15:
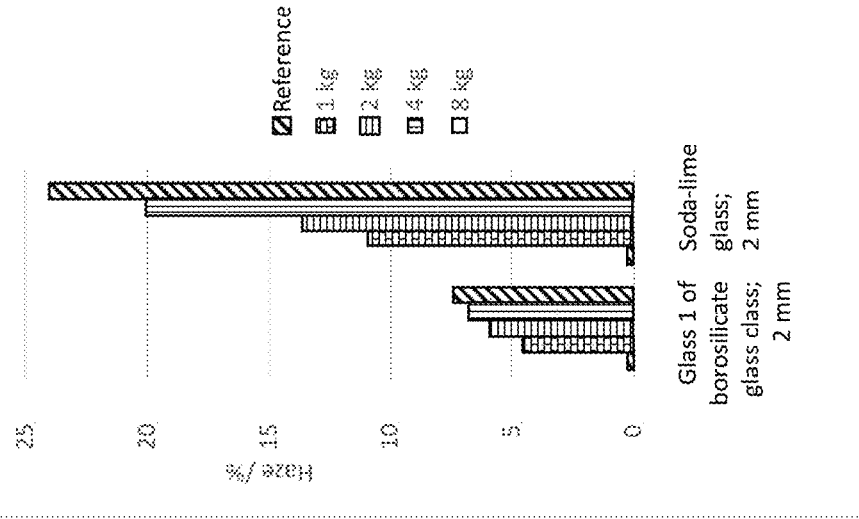
FIG. 15 shows a table of haze values of the optical disturbances which occurred in a sand trickling test (based on DIN 52348) for different glasses, in particular for a non-toughened borosilicate glass and for a soda-lime glass.

FIG. 15 shows a table of haze values of the optical disturbances caused in a sand trickling test that was performed according to DIN 52348 on different glasses, in particular on a non-toughened borosilicate glass produced according to the inventive method, and on a soda-lime glass, also abbreviated SL in the context of the present disclosure, as a function of the amount of sand used for the damaging.

All of the above measurements reveal significantly less damage to the surface 48 of the glass substrate 13 made of borosilicate glass produced according to the inventive method than observed on the surface of a respective soda-lime glass.

This fact becomes also apparent in a particularly impressive way from FIG. 13, which provides an evaluation of the respective damaged surface area for these two glasses.

FIG. 16 is a schematic view, not drawn to scale, of a laminated glass pane 59 comprising a first glass sheet 60, a polymeric layer 61 disposed between the first glass sheet 60 and a second glass sheet 62 and bonding them to each other, and finally the second glass sheet 62.

More generally, however, without being limited to the exemplary embodiment illustrated here, it is also possible for the laminated glass pane to comprise more than two glass sheets. For example, this may be the case when particularly high mechanical loads are expected and, accordingly, a particularly high strength of the laminated glass pane is intended.

The polymeric layer 61 has a thickness between at least 0.35 mm and at most 1.7 mm. It may be provided in the form of a film, for example a film comprising EVA and/or polyvinyl butyral, or in the form of a layer comprising a plurality of films, or a multilayer film. However, it is also possible for the polymeric layer to be formed in situ, by applying monomers to one of the two glass sheets 60, 62 and starting a polymerization reaction. Generally, it is also possible for the polymeric layer 61 to be formed of laminated films. In particular, the films may also comprise PET and/or PE. In the case of a multilayer film, the layers may have different compositions and physical properties. Generally, the film or a layer of a multilayer film may have a low-E coating or what is known as a solar control coating, and/or may include heating wires embedded therein, or even in addition to the heating wires or optionally as an alternative thereto, a transparent conductive layer with additional contacts, which may be used for heating purposes, inter alia.

Furthermore, in the illustrated embodiment, the first glass sheet 60 has a greater thickness than the second glass sheet 62. This is advantageous, for example, if the first glass sheet has a lower intrinsic strength than the glass sheet 62, and so the thickness of the first glass sheet 60 is increased accordingly to ensure a sufficient strength of the laminated glass pane 59 as a whole.

The first glass sheet 64, which may in particular be the outer sheet, preferably has a thickness between at least 0.3 mm and at most 3.5 mm, for trucks even of up to at most 5 mm, and comprises or consists of the glass substrate 54 as described herein. The thickness of the glass substrate 54 is indicated by reference character D only in FIG. 16, merely by way of example, but is meant to be disclosed for all other embodiments of the glass substrate 54 described herein as well.

The glasses of the first and second glass sheets 59, 62 are preferably matched to one another such that the temperatures at which the two glasses of the first and second glass sheets have the same viscosity in the viscosity range between log $\eta/dPa \cdot s=7$ and log $\eta/dPa \cdot s=10$ only differ from each other by a maximum of 50° C., preferably by a maximum of 30° C., more preferably by a maximum of 20° C., and most preferably by a maximum of 10° C.

Preferably, the second glass sheet 62 is provided in the form of a chemically toughened sheet, preferably as a chemically toughened sheet with a compressive stress zone of at least 40 μm thickness, the compressive stress being at least 150 MPa and at most 900 MPa.

According to a further embodiment of the invention, the compressive stress is at most 800 MPa, preferably at most 600 MPa. Such compressive stress is achieved in particular by toughening using a sodium nitrate-potassium nitrate mixture.

According to a further preferred embodiment, the compressive stress is at most 500 MPa, preferably at most 400 MPa, more preferably at most 300 MPa, and most preferably at most 250 MPa. Such compressive stresses can be achieved in particular by toughening using a pure sodium nitrate melt.

According to a preferred embodiment shown in FIG. 17, the laminated glass pane 59 is provided in the form of a curved laminated glass pane, in particular as a motor vehicle glazing, so that the outwardly facing side of the second glass sheet 62 is curved concavely. In the case of this shaping for generating the curvature, the glass substrate of the second glass sheet 62 may be subject to slight thickness variations in the thickness D.

Especially when used as a motor vehicle glazing, both composite glass panes 59 shown in FIG. 16 and in FIG. 17 may define a reflection surface 65 for a head-up display, in particular if used for a head-up display in vehicles operated on land, on or in the water, and in the air, in particular motor-powered vehicles. If the laminated glass pane 59 is used in this way, the first glass sheet 60 may face the exterior of the vehicle and the second glass sheet 62 may face the interior of the vehicle. In this case, the reflection surface 65 for a head-up display may be provided on the surface 63 of the second glass sheet 62 which faces the interior of the vehicle. In this case, the reflection surface 65 may extend over the entire surface 63 or else may extend only over a portion of the surface 63, which is illustrated by a double arrow 66 in FIGS. 16 and 17, by way of example. Head-up displays are well known to those skilled in the art and therefore require no further detailed discussion.

According to a further preferred embodiment, the second glass sheet 62 has a zebra angle of greater than or equal to 45°, in particular of greater than or equal to 50°, most preferably of greater than or equal to 55°, at a thickness of 0.7 mm. With regard to the zebra angle and ring-on bending strength mentioned below, reference is made to application document DE 10 2016 125 488 which is also incorporated into the subject matter of the present application by reference.

Although the zebra angle is only defined for flat sheets with parallel surfaces in the strict sense, cf., e.g., ASTM C 1036-06, and not for laminates or panes, the procedure described in ASTM C 1036-06 may, however, also be used for laminates as disclosed herein.

According to a further embodiment of the invention, the second glass sheet 62 exhibits a ring-on-ring bending strength of more than 150 MPa, in particular more than 250 MPa, preferably more than 300 MPa, more preferably more than 400 MPa, particularly preferably more than 500 MPa, and most preferably more than 600 MPa, and less than 900 MPa.

Furthermore, according to another embodiment, the laminated glass pane 1 is formed such that the second glass sheet 4, at a thickness of 0.7 mm, exhibits a transmittance of more than 91.5% at a wavelength of 840 nm, of more than 91.5% at a wavelength of 560 nm, and of more than 90% at 380 nm. As already mentioned above, this is particularly advantageous for achieving of a good view through the pane 1, so that passenger safety is further improved in this way.

A surface 67 which is assigned to driver assistance systems and which may include sensors of such systems arranged thereon, in particular imaging optical sensors, may be provided in a peripheral area of the laminated glass pane 59 and is represented by a double arrow 68 in FIGS. 16 and 17, by way of example.

Preferably, the laminated glass pane 59 is designed such that the temperatures at which the glasses of the first glass sheet 60 and of the second glass sheet 62 have the same viscosity in the viscosity range between log $(\eta/dPa \cdot s)=7$ and log $(\eta/dPa \cdot s)=10$ only differ from each other by a maximum of 50° C., preferably by a maximum of 30° C., more preferably by a maximum of 20° C., and most preferably by a maximum of 10° C.

According to yet another embodiment, the second glass sheet 62 is provided in a chemically toughened form, substantially by exchanging lithium ions and/or sodium ions by sodium ions and/or potassium ions. A second glass sheet 62 is referred to as being "toughened substantially by exchanging lithium ions by sodium ions", if the major portion of preliminary stress, i.e. at least 80% of the generated preliminary stress, is caused by the exchange of lithium ions by sodium ions. A glass sheet is in particular toughened substantially by an exchange of lithium ions by sodium ions if the preliminary stress is exclusively achieved by this exchange.

The second sheet 62 may also be made of an aluminosilicate glass in which the chemical toughening was essentially achieved by the exchange of sodium ions by potassium ions.

The second sheet 62 may also be made of a conventional soda-lime glass or a soda-lime glass especially adapted for the chemical toughening, in which, again, sodium ions were exchanged by potassium ions.

FIG. 17 shows the embodiment of a laminated glass pane 59 which may in particular be a motor vehicle glazing. In this case, again, the laminated glass pane 59 comprises a first glass sheet 60, a polymeric layer 61, and a second glass sheet 62. However, this time the laminated glass pane 59 is curved. It is possible in this case that the thickness of the individual glass sheets 60, 62 and of the polymeric layer 61 decreases from the center of the laminated glass pane 59 towards the edges, as shown. However, it is also possible that the individual glass sheets 60, 62 and also the polymeric layer 61 each have a consistent thickness, or that only individual layers 60, 61, 62 of the layers making up the laminated glass pane 59 have a thickness that varies over the cross section of the pane 59. For example, one or more of the layers may be wedge-shaped.

In the present case, the laminated glass pane 59 is formed such that the outwardly facing surface 63 of the second glass sheet 62 is curved concavely.

More generally, without being limited to the example depicted here, the laminated glass pane 59 may as well be formed such that the outwardly facing surface 64 of the first glass sheet 60 is curved concavely.

List of Reference Numerals

| | |
|---|---|
| 1 | Apparatus for producing a glass substrate for vehicle glazing, in particular for a windscreen of a vehicle, in particular apparatus for producing floated glass, float system |
| 2 | Melting tank or melting furnace |
| 3 | Glass batch |
| 4 | Burner |
| 5 | Glass melt |
| 6 | Channel of melting tank |
| 7 | Float bath, in particular tin bath |
| 8 | Molten glass to be hot formed |
| 9 | Float bath furnace |
| 10 | Electric ceiling heaters |
| 11 | Inlet lip, lip stone, or spout |
| 12 | Top roller |
| 13 | Glass ribbon or glass substrate |
| 14 | Annealing lehr |
| 15 | Electric ceiling and bottom heaters |
| 16 | Device for melting |
| 17 | Throughput control component, control gate, tweel |
| 18 | Device for defined adjustment of viscosity |
| 19 | Chamber |
| 20 | Fluid flow area |
| 21 | Fluid flow area |
| 22 | Wall of chamber 19 |
| 23 | Wall of chamber 19 |
| 24 | Wall of chamber 19 |
| 25 | Wall of chamber 19 |
| 26 | Sensing unit |
| 27 | Bay or trough section 1 |
| 28 | Bay or trough section 2 |
| 29 | Bay or trough section 3 |
| 30 | Bay or trough section 4 |
| 31 | Bay or trough section 5 |
| 32 | Bay or trough section 6 |
| 33 | Top roller |
| 34 | Top roller |
| 35 | Top roller |
| 36 | Top roller |
| 37 | Top roller |
| 38 | Top roller |
| 39 | Top roller |
| 40 | Wall of channel 6 |
| 41 | Wall of channel 6 |
| 42 | Device for hot forming |
| 43 | Main surface |
| 44 | Main surface |
| 45 | Longitudinal or symmetry axis of top roller 42 |
| 46 | Longitudinal or symmetry axis of top roller 44 |
| 47 | Perpendicular to the symmetry axis 50 in negative Z-direction |
| 48 | Perpendicular to the symmetry axis 50 in negative Z-direction |
| 49 | Location of entry of the glass 8 into hot forming section Hs |
| 50 | Location of exit of the glass 8 from hot forming section Hs |
| 51 | Gas feeding device |
| 52 | Gas feeding device |
| 53 | Extraction device |
| 54 | Laminated glass pane |
| 55 | First glass sheet |
| 56 | Polymeric layer |
| 57 | Second glass sheet |
| 58 | Outwardly facing surface of second glass sheet 62 |
| 59 | Outwardly facing surface of first glass sheet 60 |
| 60 | Reflection surface for a head-up display on the outwardly facing surface 63 of second glass sheet 62 |
| 61 | Double arrow |
| 62 | Area 67 which is assigned to driver assistance systems and on which sensors of such systems may be arranged, in particular imaging optical sensors, and which is illustrated by a double arrow 68 in FIGS. 16 and 17, by way of example |
| 63 | Double arrow |
| Ve | Entry velocity |
| Va | Exit velocity |
| De | Thickness at entry, preferably corresponding to equilibrium thickness Dg of the glass 8 |
| Da | Thickness at exit, corresponding to the thickness D of the hot-formed glass |
| D | Thickness of the hot-formed glass |
| Bg | Width of the glass ribbon to be hot formed and hot-formed, also referred to as gross width |
| Nf | New surface area |
| Av | Aging velocity |
| Hs | Hot forming section along which the hot forming according to the invention is effected |
| Hsl | Length of section Hs |
| Snb | Layer depleted in sodium borate |
| He | Hot end of float bath 7, hot end |
| Ce | Cold end of float bath 7, cold end |

The invention claimed is:

1. A method for producing a glass substrate for vehicle glazing, comprising:

hot forming a borosilicate glass to have an average thickness from 0.3 mm to 5 mm in a hot forming section;

adjusting a viscosity of the borosilicate glass to be between log $(\eta/dPa\cdot s)$=4.8 and log $(\eta/dPa\cdot s)$=5.5 at a beginning of the hot forming section by temperature control, wherein the temperature control comprises a heat absorbing chamber upstream of a throughput control component and ceiling heaters of a float bath furnace that has a tin bath onto which molten glass to be hot formed into the borosilicate glass is transferred through the throughput control component, wherein the heat absorbing chamber comprises fluid flow areas forming a metallic pipe system through which water flows and which absorb heat from the molten glass to be hot formed, wherein the metallic pipe system comprises a heat-absorbing dye or a temperature-resistant paint on a surface thereof;

maintaining an aging velocity (Av) of glass to be hot formed while stretching the borosilicate glass in a flow direction or a longitudinal direction of movement of the borosilicate glass in the hot forming section to not exceed 10 mm/s and to not undershoot 3 mm/s;

wherein the following equation applies to the aging velocity (Av):

Av=(a difference in velocity in the hot forming section)*Bg/Hsl where:
Bg is a width of the borosilicate glass to be hot formed in the hot forming section; and
Hsl is a length of hot forming section along which the borosilicate glass is stretched;
maintaining the width Bg so that the width Bg is altered by less than 3% in the hot forming section; and
adjusting the viscosity of the borosilicate glass to be between log ($\eta$/dPa·s)=7.1 and log ($\eta$/dPa·s)=7.6 at an end of the hot forming section.

2. The method of claim 1, wherein the aging velocity (Av) does not exceed 8 mm/s and does not undershoot 5 mm/s.

3. The method of claim 1, wherein the length of hot forming section extends in the flow direction of the glass from a first top roller defining the beginning of the hot forming section to a last top roller defining the end of the hot forming section.

4. The method of claim 1, further comprising exposing the borosilicate glass to a forming gas atmosphere containing a hydrogen content from 2 vol % to 14 vol %.

5. The method of claim 1, wherein the borosilicate glass comprises (in wt %):

| | |
|---|---|
| $SiO_2$ | 70-87 |
| $B_2O_3$ | 7-25 |
| $Na_2O + K_2O$ | 0.5-9 |
| $Al_2O_3$ | 0-7 |
| CaO | 0-3. |

6. The method of claim 1, wherein the borosilicate glass comprises (in wt %):

| | |
|---|---|
| $SiO_2$ | 70-86 |
| $Al_2O_3$ | 0-5 |
| $B_2O_3$ | 9.0-25 |
| $Na_2O$ | 0.5-5.0 |
| $K_2O$ | 0-1.0 |
| $Li_2O$ | 0-1.0. |

7. The method of claim 1, wherein the borosilicate glass is an alkali borosilicate glass comprising (in wt %):

| | |
|---|---|
| $SiO_2$ | 78.3-81.0 |
| $B_2O_3$ | 9.0-13.0 |
| $Al_2O_3$ | 3.5-5.3 |
| $Na_2O$ | 3.5-6.5 |
| $K_2O$ | 0.3-2.0 |
| CaO | 0.0-2.0. |

8. The method of claim 1, wherein the glass substrate has a substantially wedge-shaped thickness variation (K) of less than 100 μm over a length of 1 m perpendicular to the flow direction.

9. The method of claim 1, wherein the glass substrate has a warpage (V) of less than 600 μm over a length of 1 m perpendicular to the flow direction.

10. A method for producing a glass substrate for vehicle glazing, comprising:
hot forming a borosilicate glass to have an average thickness from 0.3 mm to 5 mm in a hot forming section;
stretching the borosilicate glass in a flow direction or in a longitudinal direction of movement of the borosilicate glass to not exceed 10 mm/s and to not undershoot a value of 3 mm/s to maintain an aging velocity (Av) of the borosilicate glass, at least during the stretching,
wherein the following applies to the aging velocity (Av):

Av=Nf/(t*Hsl)

where:
Nf is a new surface area of a main surface that is newly formed during the hot forming process;
t is a time passed in the hot forming section during the hot forming; and
Hsl is a length of hot forming section along which the borosilicate glass is stretched;
maintaining a width of the borosilicate glass to be hot formed in the hot forming section so that the width is altered by less than 3% in the hot forming section
adjusting a viscosity of the borosilicate glass to be between log ($\eta$/dPa·s)=4.8 and log ($\eta$/dPa·s)=5.5 at a beginning of the hot forming section by temperature control,
wherein the temperature control comprises a heat absorbing chamber upstream of a throughput control component and ceiling heaters of a float bath furnace that has a tin bath onto which molten glass to be hot formed into the borosilicate glass is transferred through the throughput control component,
wherein the heat absorbing chamber comprises fluid flow areas forming a metallic pipe system through which water flows and which absorb heat from the molten glass to be hot formed,
wherein the metallic pipe system comprises a heat-absorbing dye or a temperature-resistant paint on a surface thereof; and
adjusting the viscosity of the borosilicate glass to be between log ($\eta$/dPa·s)=7.1 and log ($\eta$/dPa·s)=7.6 at an end of the hot forming section.

11. The method of claim 10, wherein the aging velocity (Av) does not exceed 8 mm/s and does not undershoot the value of 5 mm/s.

12. The method of claim 10, wherein the length of hot forming section extends in the flow direction of the borosilicate glass from a first top roller defining the beginning of the hot forming section to a last top roller defining the end of the hot forming section.

13. The method of claim 10, further comprising exposing the borosilicate glass to a forming gas atmosphere containing a hydrogen content from 2 vol % to 14 vol %.

14. The method of claim 10, wherein the borosilicate glass comprises (in wt %):

| | |
|---|---|
| $SiO_2$ | 70-87 |
| $B_2O_3$ | 7-25 |
| $Na_2O + K_2O$ | 0.5-9 |
| $Al_2O_3$ | 0-7 |
| CaO | 0-3. |

15. The method of claim 10, wherein the borosilicate glass comprises (in wt %).

| | |
|---|---|
| $SiO_2$ | 70-86 |
| $Al_2O_3$ | 0-5 |
| $B_2O_3$ | 9.0-25 |
| $Na_2O$ | 0.5-5.0 |

-continued

| | |
|---|---|
| K$_2$O | 0-1.0 |
| Li$_2$O | 0-1.0. |

16. The method of claim 10, wherein the borosilicate glass is an alkali borosilicate glass comprising (in wt %):

| | |
|---|---|
| SiO$_2$ | 78.3-81.0 |
| B$_2$O$_3$ | 9.0-13.0 |
| Al$_2$O$_3$ | 3.5-5.3 |
| Na$_2$O | 3.5-6.5 |
| K$_2$O | 0.3-2.0 |
| CaO | 0.0-2.0. |

17. The method of claim 10, wherein the glass substrate has a substantially wedge-shaped thickness variation (K) of less than 100 μm over a length of 1 m perpendicular to the flow direction.

18. The method of claim 10, wherein the glass substrate has a warpage (V) of less than 600 μm over a length of 1 m perpendicular to the flow direction.

19. A method for producing a glass substrate for vehicle glazing, comprising:
hot forming a borosilicate glass to have an average thickness from 0.3 mm to 5 mm in a hot forming section;
stretching the borosilicate glass in a flow direction or in a longitudinal direction of movement of the borosilicate glass, to maintain, at least during the stretching, a ratio of a new surface area (Nf) of a main surface that is newly formed during the hot forming process to a length (Hsl) of the hot forming section in the flow direction or longitudinal direction of movement of the borosilicate glass and to a time (t) passed in the hot forming section during the time of hot forming does not exceed 10 mm/s and does not undershoot a value of 3 mm/s;
maintaining a width of the borosilicate glass to be hot formed in the hot forming section so that the width is altered by less than 3% in the hot forming section;
adjusting a viscosity of the borosilicate glass to be between log (η/dPa·s)=4.8 and log (η/dPa·s)=5.5 at a beginning of the hot forming section by temperature control,
wherein the temperature control comprises a heat absorbing chamber upstream of a throughput control component and ceiling heaters of a float bath furnace that has a tin bath onto which molten glass to be hot formed into the borosilicate glass is transferred through the throughput control component
wherein the heat absorbing chamber comprises fluid flow areas forming a metallic pipe system through which water flows and which absorb heat from the molten glass to be hot formed,
wherein the metallic pipe system comprises a heat-absorbing dye or a temperature-resistant paint on a surface thereof; and
adjusting the viscosity of the borosilicate glass to be between log (η/dPa·s)=7.1 and log (η/dPa·s)=7.6 at an end of the hot forming section.

20. The method of claim 19, wherein the hot forming comprises floating on a float bath, and wherein the main surface faces away from the float bath.

21. The method of claim 20, further comprising exposing the borosilicate glass to a forming gas atmosphere containing a hydrogen content from 2 vol % to 14 vol %.

22. The method of claim 21, further comprising intentionally discharging at least ⅔ of the forming gas atmosphere through extraction devices at a hot end of the float bath.

23. The method of claim 21, further comprising maintaining an oxygen partial pressure at a cold end of the float bath in the forming gas atmosphere to lower than $10^{-25}$ bar.

24. The method of claim 19, further comprising maintaining a depletion of sodium borate in a near-surface layer that extends to a depth of 10 μm to less than 30% of the sodium borate in the glass substrate.

25. The method of claim 19, wherein the heat absorbing chamber is separated from a melting tank from which the molten glass to be hot formed is received into the heat absorbing chamber.

26. The method of claim 25, wherein the heat absorbing chamber comprises a plurality of walls and the heat absorbing chamber is provided spatially separated from the melting tank.

* * * * *